(12) United States Patent
Ould-Ahmed-Vall

(10) Patent No.: US 10,929,145 B2
(45) Date of Patent: Feb. 23, 2021

(54) MASK GENERATION USING REDUCTION OPERATORS AND SCATTER USE THEREOF

(71) Applicant: Intel Corporation, Santa Clara, CA (US)

(72) Inventor: Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 16/235,940

(22) Filed: Dec. 28, 2018

(65) Prior Publication Data

US 2020/0210199 A1    Jul. 2, 2020

(51) Int. Cl.
*G06F 9/30* (2018.01)
*G06F 9/38* (2018.01)

(52) U.S. Cl.
CPC .......... *G06F 9/3887* (2013.01); *G06F 9/3001* (2013.01); *G06F 9/3016* (2013.01); *G06F 9/30018* (2013.01); *G06F 9/3802* (2013.01); *G06F 9/3818* (2013.01); *G06F 9/3824* (2013.01); *G06F 9/3836* (2013.01); *G06F 9/3867* (2013.01)

(58) Field of Classification Search
None
See application file for complete search history.

(56) References Cited

U.S. PATENT DOCUMENTS

| 9,411,592 | B2 * | 8/2016 | Valentine | G06F 9/30145 |
| 2003/0147077 | A1 * | 8/2003 | Carpi | G03F 9/7065 356/401 |
| 2009/0249026 | A1 * | 10/2009 | Smelyanskiy | G06F 9/30032 712/4 |
| 2016/0299763 | A1 * | 10/2016 | Hughes | G06F 9/30032 |
| 2017/0185414 | A1 | 6/2017 | Jin et al. | |

* cited by examiner

*Primary Examiner* — Corey S Faherty
(74) *Attorney, Agent, or Firm* — Nicholson De Vos Webster & Elliott LLP

(57) ABSTRACT

Novel instructions, their format, and support thereof are described. For example, an instruction including a field for an opcode to indicate a reduction-based mask generation operation is to be performed, a field to identify a first packed data source operand, a field to identify a second packed data source operand, and a field to identify a destination operand to store reduction-based generated mask and its hardware support is described.

37 Claims, 23 Drawing Sheets

FETCH AN INSTRUCTION HAVING A FIELD FOR AN OPCODE TO INDICATE A REDUCTION-BASED MASK GENERATION OPERATION IS TO BE PERFORMED, A FIELD TO IDENTIFY A FIRST PACKED DATA SOURCE OPERAND, A FIELD TO IDENTIFY A SECOND PACKED DATA SOURCE OPERAND, A FIELD TO IDENTIFY A DESTINATION OPERAND TO STORE THE GENERATED MASK, AND A FIELD TO STORE AN IMMEDIATE 901

DECODE THE INSTRUCTION HAVING THE FIELD FOR AN OPCODE TO INDICATE THE REDUCTION-BASED MASK GENERATION OPERATION IS TO BE PERFORMED, THE FIELD TO IDENTIFY A FIRST PACKED DATA SOURCE OPERAND, A FIELD TO IDENTIFY THE SECOND PACKED DATA SOURCE OPERAND, THE FIELD TO IDENTIFY A DESTINATION OPERAND TO STORE THE GENERATED MASK, AND THE FIELD TO STORE AN IMMEDIATE 903

RETRIEVE DATA ASSOCIATED WITH THE IDENTIFIED SOURCE OPERANDS 905

SCHEDULE THE DECODED INSTRUCTION 907

EXECUTE THE DECODED INSTRUCTION TO GENERATE THE MASK ACCORDING TO A REDUCTION OPERATION SPECIFIED BY THE IMMEDIATE BY DETERMINING WHETHER THERE ARE CONFLICTS BETWEEN DATA ELEMENTS OF THE IDENTIFIED FIRST PACKED DATA SOURCE OPERAND AND 1) FOR EACH DATA ELEMENT POSITION WHERE THERE IS NOT A CONFLICT, SETTING A CORRESPONDING DATA ELEMENT POSITION IN THE IDENTIFIED DESTINATION OPERAND; 2) FOR EACH CONFLICT, APPLYING THE REDUCTION OPERATION TO DATA ELEMENTS OF CORRESPONDING DATA ELEMENTS OF THE IDENTIFIED SECOND PACKED DATA SOURCE OPERAND TO DETERMINE WHICH DATA ELEMENT POSITION TO SET IN THE IDENTIFIED DESTINATION OPERAND AND SETTING SAID POSITION; AND 3) IN SOME INSTANCES, UPDATING THE IDENTIFIED SECOND PACKED DATA SOURCE OPERAND ACCORDING TO THE REDUCTION OPERATION 909

COMMIT A RESULT OF THE EXECUTED INSTRUCTION 911

*FIG. 9*

FETCH AN INSTRUCTION HAVING A FIELD FOR AN OPCODE TO INDICATE A REDUCTION-BASED MASK GENERATION OPERATION THAT TO BE PERFORMED, A FIELD TO IDENTIFY A FIRST PACKED DATA SOURCE OPERAND, A FIELD TO IDENTIFY A SECOND PACKED DATA SOURCE OPERAND, AND A FIELD TO IDENTIFY A DESTINATION OPERAND TO STORE THE GENERATED MASK 1001

↓

DECODE THE INSTRUCTION HAVING THE FIELD FOR AN OPCODE TO INDICATE THE REDUCTION-BASED MASK GENERATION OPERATION THAT TO BE PERFORMED, THE FIELD TO IDENTIFY A FIRST PACKED DATA SOURCE OPERAND, THE FIELD TO IDENTIFY A SECOND PACKED DATA SOURCE OPERAND, AND THE FIELD TO IDENTIFY A DESTINATION OPERAND TO STORE THE GENERATED MASK 1003

↓

RETRIEVE DATA ASSOCIATED WITH THE IDENTIFIED SOURCE OPERANDS 1005

↓

SCHEDULE THE DECODED INSTRUCTION 1007

↓

EXECUTE THE DECODED INSTRUCTION TO GENERATE THE MASK ACCORDING TO A REDUCTION OPERATION SPECIFIED BY THE IMMEDIATE BY DETERMINING WHETHER THERE ARE CONFLICTS BETWEEN DATA ELEMENTS OF THE IDENTIFIED FIRST PACKED DATA SOURCE OPERAND AND 1) FOR EACH DATA ELEMENT POSITION WHERE THERE IS NOT A CONFLICT, SETTING A CORRESPONDING DATA ELEMENT POSITION IN THE IDENTIFIED DESTINATION OPERAND; 2) FOR EACH CONFLICT, APPLYING THE REDUCTION OPERATION TO DATA ELEMENTS OF CORRESPONDING DATA ELEMENTS OF THE IDENTIFIED SECOND PACKED DATA SOURCE OPERAND TO DETERMINE WHICH DATA ELEMENT POSITION TO SET IN THE IDENTIFIED DESTINATION OPERAND AND SETTING SAID POSITION; AND 3) IN SOME INSTANCES, UPDATING THE IDENTIFIED SECOND PACKED DATA SOURCE OPERAND ACCORDING TO THE REDUCTION OPERATION 1009

↓

COMMIT A RESULT OF THE EXECUTED INSTRUCTION 1011

*FIG. 10*

FETCH AN INSTRUCTION HAVING A FIELD FOR AN OPCODE TO INDICATE A REDUCTION BASED SCATTER OPERATION IS TO BE PERFORMED, A FIELD TO IDENTIFY A FIRST PACKED DATA SOURCE OPERAND, A FIELD TO IDENTIFY A SECOND PACKED DATA SOURCE OPERAND, ONE OR MORE FIELDS TO BE USED TO GENERATE ONE OR MORE DESTINATION ADDRESS(ES), AND A FIELD TO STORE AN IMMEDIATE 1101

DECODE THE INSTRUCTION HAVING THE FIELD FOR AN OPCODE TO INDICATE THE REDUCTION BASED SCATTER OPERATION IS TO BE PERFORMED, THE FIELD TO IDENTIFY A FIRST PACKED DATA SOURCE OPERAND, THE FIELD TO IDENTIFY A SECOND PACKED DATA SOURCE OPERAND, ONE OR MORE FIELDS TO BE USED TO GENERATE ONE OR MORE DESTINATION ADDRESS(ES), AND THE FIELD TO STORE AN IMMEDIATE 1103

RETRIEVE DATA ASSOCIATED WITH THE IDENTIFIED SOURCE OPERANDS 1105

SCHEDULE THE DECODED INSTRUCTION 1107

EXECUTE THE DECODED INSTRUCTION TO SCATTER TO MEMORY DATA ELEMENTS OF SELECTED DATA ELEMENT POSITIONS OF THE IDENTIFIED SECOND PACKED USING INDEX VALUES OF THE IDENTIFIED FIRST PACKED DATA SOURCE OPERAND ACCORDING TO A MASK GENERATED BY DETERMINING WHETHER THERE ARE CONFLICTS BETWEEN DATA ELEMENTS OF THE IDENTIFIED FIRST PACKED DATA SOURCE OPERAND AND 1) FOR EACH DATA ELEMENT POSITION WHERE THERE IS NOT A CONFLICT SETTING A CORRESPONDING DATA ELEMENT POSITION IN THE IDENTIFIED DESTINATION OPERAND; 2) FOR EACH CONFLICT, APPLYING A REDUCTION OPERATION INDICATED BY THE IMMEDIATE TO DATA ELEMENTS OF CORRESPONDING DATA ELEMENTS OF THE IDENTIFIED SECOND PACKED DATA SOURCE OPERAND TO DETERMINE WHICH DATA ELEMENT POSITION TO SET IN THE IDENTIFIED DESTINATION OPERAND AND SETTING SAID POSITION; 3) IN SOME INSTANCES, UPDATING THE IDENTIFIED SECOND PACKED DATA SOURCE OPERAND ACCORDING TO THE REDUCTION OPERATION; AND 4) SCATTERING DATA ELEMENTS OF THE (UPDATED) SECOND PACKED DATA SOURCE OPERAND AT ADDRESSES GENERATED USING SIB ADDRESSING, WHEREIN THE INDEX OF THE SIB ADDRESS IS DETERMINED BY APPLYING THE GENERATED MASK TO THE INDICES OF THE FIRST PACKED DATA SOURCE OPERAND 1109

COMMIT A RESULT OF THE EXECUTED INSTRUCTION 1111

*FIG. 11*

FETCH AN INSTRUCTION HAVING A FIELD FOR AN OPCODE TO INDICATE A REDUCTION BASED SCATTER OPERATION IS TO BE PERFORMED INCLUDING THE REDUCTION TYPE, A FIELD TO IDENTIFY A FIRST PACKED DATA SOURCE OPERAND, A FIELD TO IDENTIFY A SECOND PACKED DATA SOURCE OPERAND, AND ONE OR MORE FIELDS TO BE USED TO GENERATE ONE OR MORE DESTINATION ADDRESS(ES) 1201

↓

DECODE THE INSTRUCTION HAVING THE FIELD FOR AN OPCODE TO INDICATE THE REDUCTION BASED SCATTER OPERATION IS TO BE PERFORMED INCLUDING THE REDUCTION TYPE, THE FIELD TO IDENTIFY A FIRST PACKED DATA SOURCE OPERAND, THE FIELD TO IDENTIFY A SECOND PACKED DATA SOURCE OPERAND, AND THE ONE OR MORE FIELDS TO BE USED TO GENERATE ONE OR MORE DESTINATION ADDRESS(ES) 1203

↓

RETRIEVE DATA ASSOCIATED WITH THE IDENTIFIED SOURCE OPERANDS 1205

↓

SCHEDULE THE DECODED INSTRUCTION 1207

↓

EXECUTE THE DECODED INSTRUCTION TO SCATTER TO MEMORY DATA ELEMENTS OF SELECTED DATA ELEMENT POSITIONS OF THE IDENTIFIED SECOND PACKED USING INDEX VALUES OF THE IDENTIFIED FIRST PACKED DATA SOURCE OPERAND ACCORDING TO A MASK GENERATED BY DETERMINING WHETHER THERE ARE CONFLICTS BETWEEN DATA ELEMENTS OF THE IDENTIFIED FIRST PACKED DATA SOURCE OPERAND AND 1) FOR EACH DATA ELEMENT POSITION WHERE THERE IS NOT A CONFLICT SETTING A CORRESPONDING DATA ELEMENT POSITION IN THE IDENTIFIED DESTINATION OPERAND; 2) FOR EACH CONFLICT, APPLYING A REDUCTION OPERATION ACCORDING TO THE OPCODE TO DATA ELEMENTS OF CORRESPONDING DATA ELEMENTS OF THE IDENTIFIED SECOND PACKED DATA SOURCE OPERAND TO DETERMINE WHICH DATA ELEMENT POSITION TO SET IN THE IDENTIFIED DESTINATION OPERAND AND SETTING SAID POSITION; 3) IN SOME INSTANCES, UPDATING THE IDENTIFIED SECOND PACKED DATA SOURCE OPERAND ACCORDING TO THE REDUCTION OPERATION; 4) SCATTERING DATA ELEMENTS OF THE (UPDATED) SECOND PACKED DATA SOURCE OPERAND AT ADDRESSES GENERATED USING SIB ADDRESSING, WHEREIN THE INDEX OF THE SIB ADDRESS IS DETERMINED BY APPLYING THE GENERATED MASK TO THE INDICES OF THE FIRST PACKED DATA SOURCE OPERAND 1209

↓

COMMIT A RESULT OF THE EXECUTED INSTRUCTION 1211

*FIG. 12*

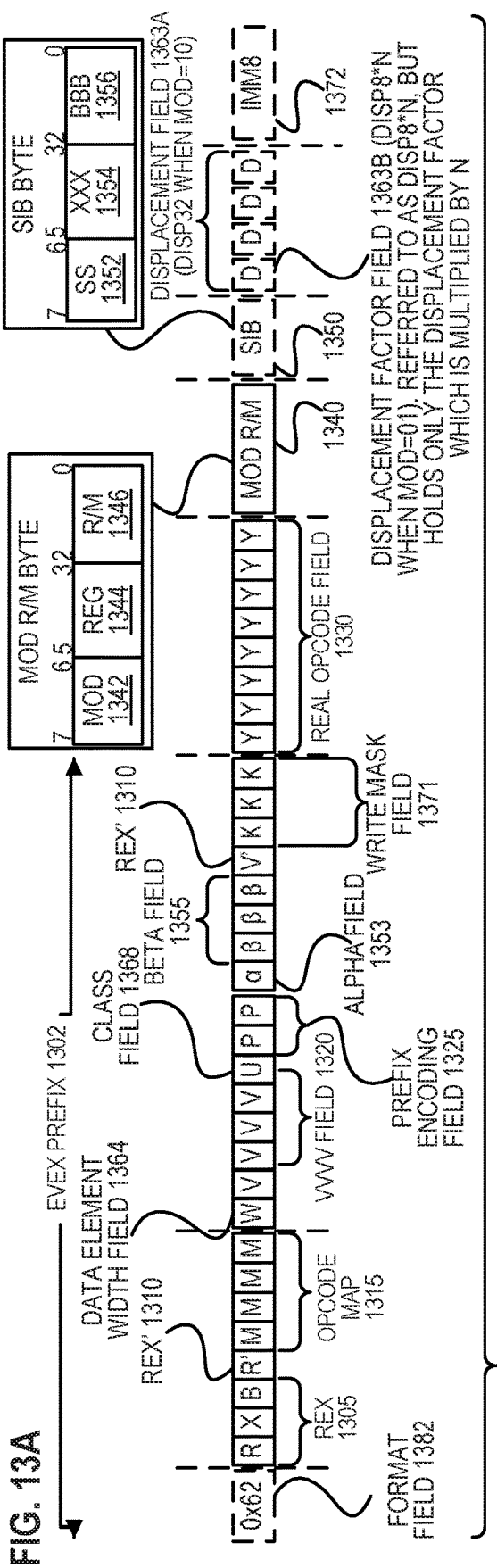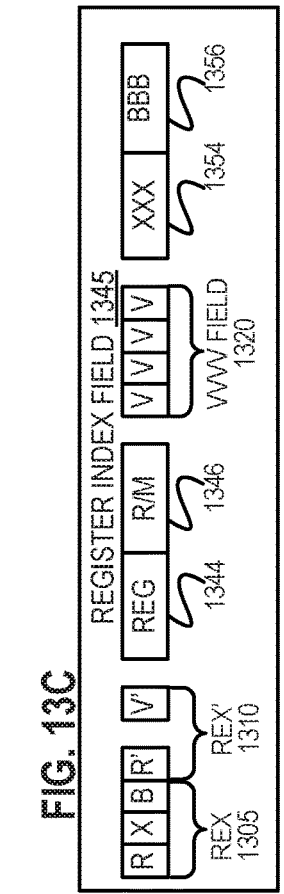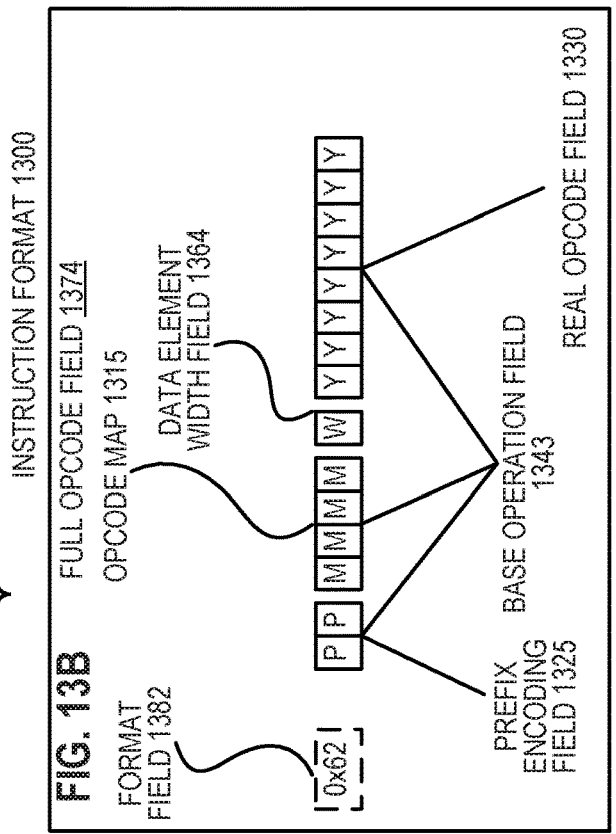

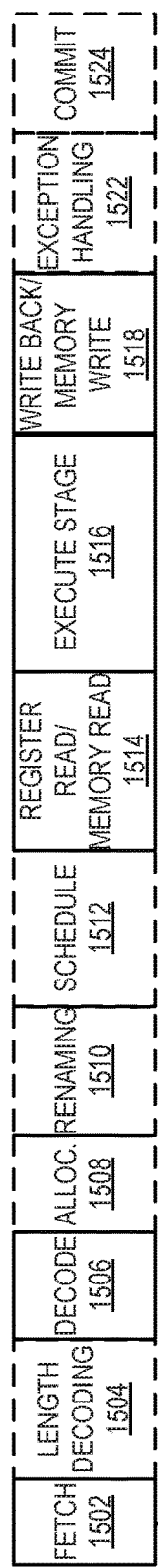
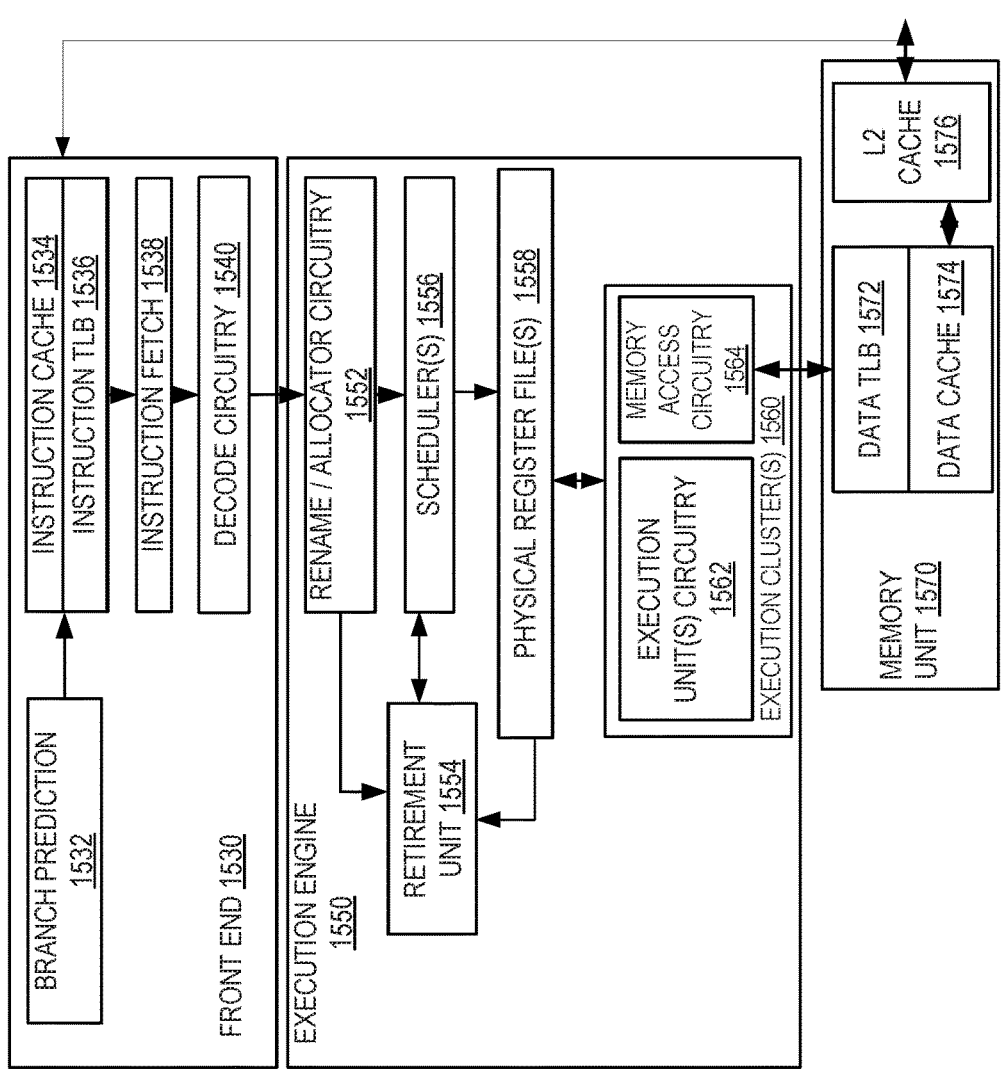
FIG. 15A
FIG. 15B

US 10,929,145 B2

MASK GENERATION USING REDUCTION OPERATORS AND SCATTER USE THEREOF

Single Instruction, Multiple Data (SIMD) architectures can be implemented in microprocessor systems to enable one instruction to operate on several operands in parallel. SIMD architectures take advantage of packing multiple data elements within one register or contiguous memory location. With parallel hardware execution, multiple operations are performed on separate data elements by one instruction to increase a performance of the microprocessor systems.

BRIEF DESCRIPTION OF DRAWINGS

Various embodiments in accordance with the present disclosure will be described with reference to the drawings, in which:

FIG. 9 illustrates an embodiment of method performed by a processor to process a reduction-based mask generation instruction.

FIG. 10 illustrates an embodiment of method performed by a processor to process a reduction-based mask generation instruction.

FIG. 11 illustrates an embodiment of method performed by a processor to process a reduction-based SCATTER instruction.

FIG. 12 illustrates an embodiment of method performed by a processor to process a reduction-based SCATTER instruction.

FIG. 13A is a block diagram illustrating an exemplary instruction format according to embodiments of the invention;

FIG. 13B is a block diagram illustrating the fields of the instruction format that make up the full opcode field according to one embodiment of the invention;

FIG. 13C is a block diagram illustrating the fields of the instruction format that make up the register index field according to one embodiment of the invention;

FIG. 15A is a block diagram illustrating both an exemplary in-order pipeline and an exemplary register renaming, out-of-order issue/execution pipeline according to embodiments of the invention;

FIG. 15B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
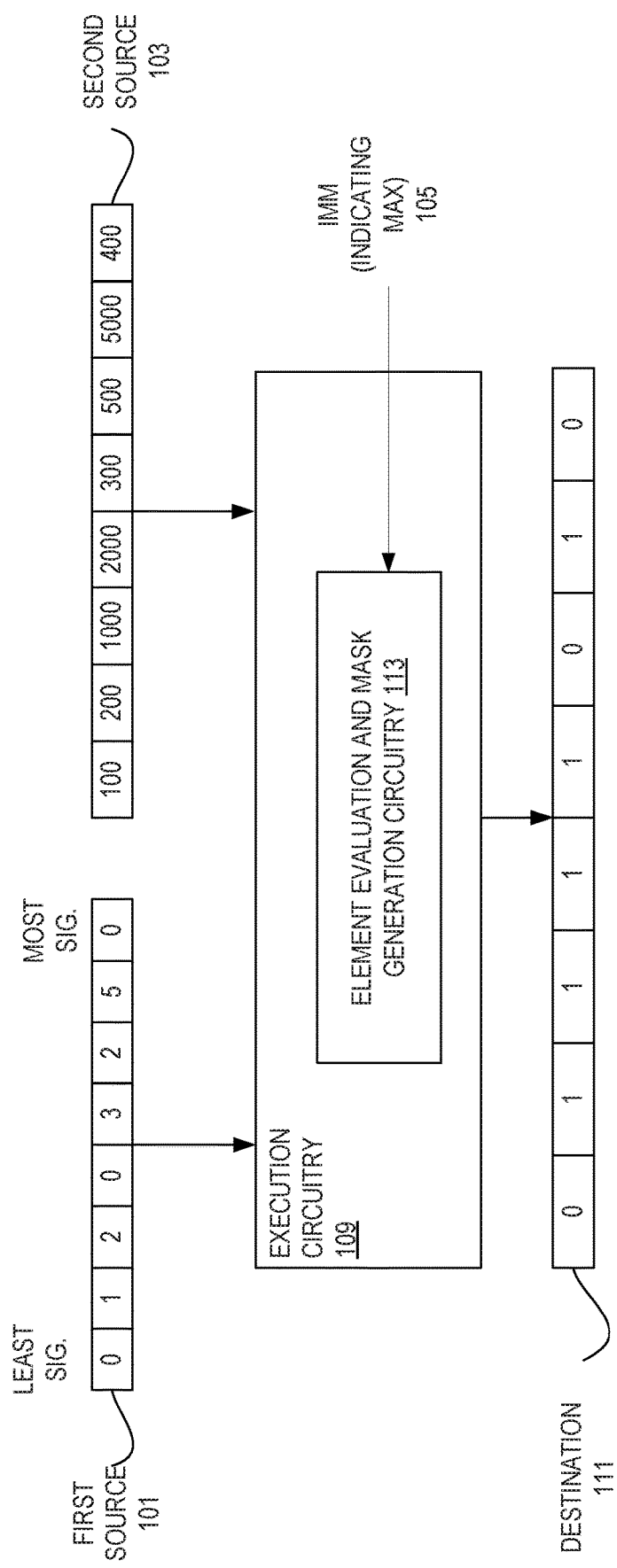
FIG. 1 illustrates an exemplary execution of an instruction to perform a generation of a conflict mask based on a reduction operation.

Various embodiments of methods, apparatus, systems, and non-transitory computer-readable storage media for implementing instructions for reduction-based conflict mask generation or scatter are described.

Many processors use vector instruction sets or single instruction, multiple data (SIMD) instruction sets to perform multiple operations in parallel. A processor can perform multiple operations in parallel, simultaneously applying operations to the same piece of data or multiple pieces of data at the same time. Vectorization is an operation to convert a scalar program that only operates on one pair of operands at once to a vector program that can run multiple operations from a single instruction. For example, vectorization is a process of rewriting a loop operation to perform a SIMD instruction, where instead of processing a single element of an array N times, it processes M elements of the array simultaneously N/M times.

Vectorization can include an instruction (such as a sparse update instruction) to perform a gather operation, a modify operation, and a scatter operation. The gather operation and the scatter operation can indirectly access registers in a memory. For example, the gather operation uses indexed reads and the scatter operation uses indexed writes. In one example, the data elements may be at non-contiguous memory locations. The gather operation reads a set of data elements from the memory locations and aggregates the data elements into a single register or cache line. The modify operation modifies one or more of the data elements in the set of data elements. The scatter operation writes the data elements in a packed data structure to a set of non-contiguous or random memory locations.

Conventionally, processors using SIMD instruction sets have a limited performance increase because applications have irregular memory access patterns. For example, applications storing data tables that require frequent and random updates to data elements, are not be stored at contiguous memory locations and require rearrangement of the data in order to fully utilize SIMD instruction sets. The rearrangement of data causes a substantial overhead and limits an efficiency of using SIMD instruction sets.

Additionally, vectorization typically assumes that a single instruction performing a gather operation, a modify operation, and/or a scatter operation will access each memory location no more than once. Unfortunately, data dependency hazards where instructions refer to the results of preceding instructions that have not been completed yet may occur.

Detailed herein are embodiments of instructions and hardware to support such instructions that should help eliminate conflicting use of data in in scatter operations and not require performing reduction operations prior to conflict mask generation or adjusting the conflict generating mask to account for a reduction operation after generation. For example, embodiments of reduction-based conflict mask instructions (e.g., VPCONFLICTMSKRED) that allow for detecting and marking in a mask occurrences of conflicts according to a reduction operator (such as minimum, maximum, arithmetic, etc.) which may, for example, then be consumed by other instructions such as scatter instructions and reduction-based scatter instructions (e.g., VPSCATTERRED) that generate such masks as a part of the instruction's execution prior to scattering (thereby condensing at least two instructions VPCONFLICTMSKRED and a scatter). Neither of these types of instructions have existed to-date and therefore represent improvements to a computer (in particular the processor) itself.

Exemplary Executions

FIG. 1 illustrates an exemplary execution of an instruction to perform a generation of a conflict mask based on a reduction operation. The instruction format includes fields for an opcode (VPCONFLICTMSKRED is an exemplary mnemonic) that indicates a generation of a conflict mask based on a reduction operation is to be performed, a field to identify a destination operand, a field to identify a first source operand, a field to identify a second source operand, and a field to store an immediate value. In some embodiments, the identified destination and source operands are packed data operands such as SIMD or vector registers. Further, in some embodiments, the field for one of the source operands is a plurality of fields to be used to determine a memory (non-register) address.

In this illustrated example, the identified first source operand 101 has 8 packed data elements (i.e., 8 vector elements or 8 SIMD elements). The identified second source operand 103 also has 8 packed data elements (i.e., 8 vector elements or 8 SIMD elements). In some instances, the identified first source operand 101 may be seen as storing index values and the identified second source operand 103 has storing data to be considered during a reduction determination.

Execution circuitry 109 is to execute the decoded instruction to generate a mask based on a reduction operation indicated by the immediate of the instruction using element evaluation and mask generation circuitry 113. The mask is an indication of: 1) what data element positions of any identified conflicts of stored values of the identified first source operand 101 that satisfy the reduction operation of the immediate 105 of the instruction and 2) where there is no conflict.

In this illustration, the immediate 105 indicates a maximum for the reduction operator. As shown, in the identified first source operand 101 the following data element positions have conflicts: positions 0, 3, and 7 all store 0; and positions 2 and 5 store 2. There are no conflicts at positions 1, 5, and 6 and corresponding data element positions of the destination operand 111 (may be called a mask) are set to indicate no conflict. For the first conflict (positions 0, 3, and 7), the element evaluation and mask generation circuitry 113 is finds which corresponding data element position of the identified second source operand 103 has the maximum (largest) value. As shown, that value is "2000" and stored in data element position 3 of the identified second source operand 103. As such, data element position 3 of the identified destination operand 111 is set. Similarly, for the second conflict the maximum value is "1000" which is stored in data element position 2 of the identified second source operand 103. As such, data element position 2 of the identified destination operand 111 is set.

Note the identified destination operand 111 is a writemask in some embodiments, where data element positions are single bits, and is a vector or SIMD register in other embodiments wherein each data element position stores a simple "1" or "0" dependent upon the result of the operation. Note that the storing of a "1" for a "mask" value is flipped for some embodiments such that a "0" would indicate a conflict, etc.

Figure 2:
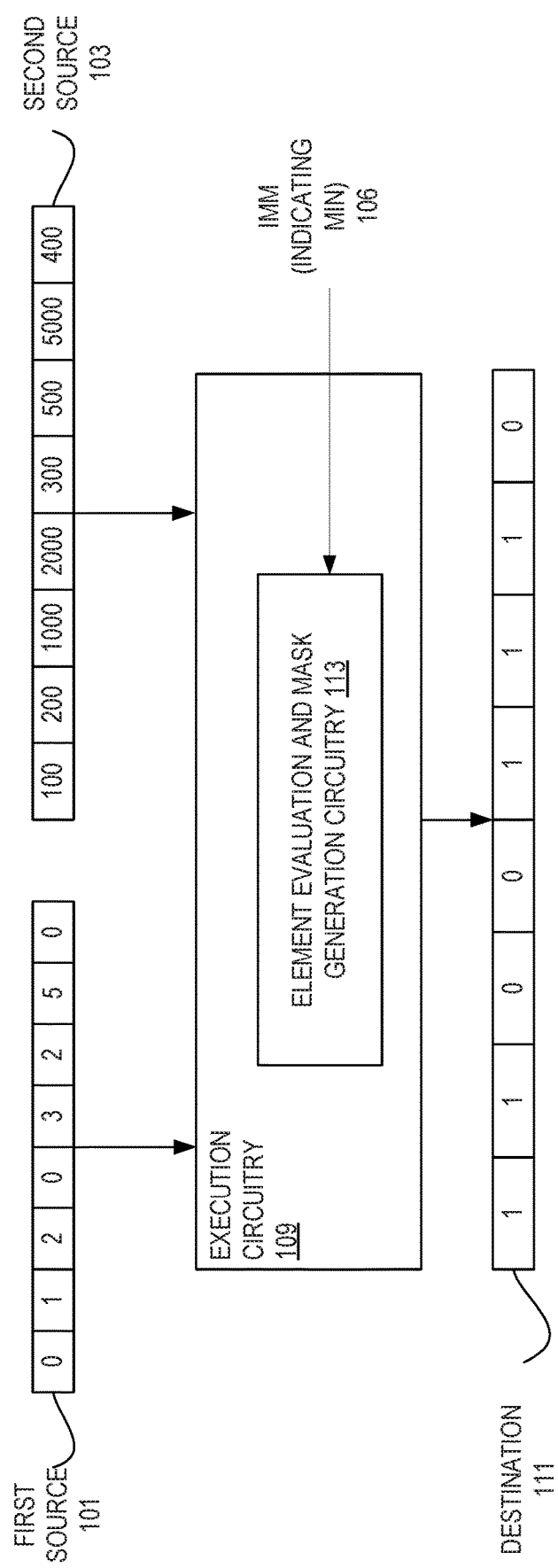
FIG. 2 illustrates an exemplary execution of an instruction to perform a generation of a conflict mask based on a minimum reduction operation.

FIG. 2 illustrates an exemplary execution of an instruction to perform a generation of a conflict mask based on a minimum reduction operation. Note the same source operands are used as in FIG. 1, but a different immediate 106 is provided which causes a different result to be stored in the identified destination operand 111.

In this illustration, the immediate 106 indicates a minimum for the reduction operator. As shown, in the identified first source operand 101 the following data element positions have conflicts: positions 0, 3, and 7 all store 0; and positions 2 and 5 store 2. There are no conflicts at positions 1, 5, and 6 and corresponding data element positions of the destination operand 111 are set to indicate no conflict. For the first conflict (positions 0, 3, and 7), the element evaluation and mask generation circuitry 113 is finds which corresponding data element position of the identified second source operand 103 has the minimum (smallest) value. As shown, that value is "100" and stored in data element position 0 of the identified second source operand 103. As such, data element position 0 of the identified destination operand 111 is set. Similarly, for the second conflict the minimum value is "500" which is stored in data element position 5 of the identified second source operand 103. As such, data element position 5 of the identified destination operand 111 is set.

Note the identified destination operand 111 is a writemask in some embodiments, where data element positions are single bits, and is a vector or SIMD register in other embodiments wherein each data element position stores a simple "1" or "0" dependent upon the result of the operation. Note that the storing of a "1" for a "mask" value is flipped for some embodiments such that a "0" would indicate a conflict, etc.

Figure 3:
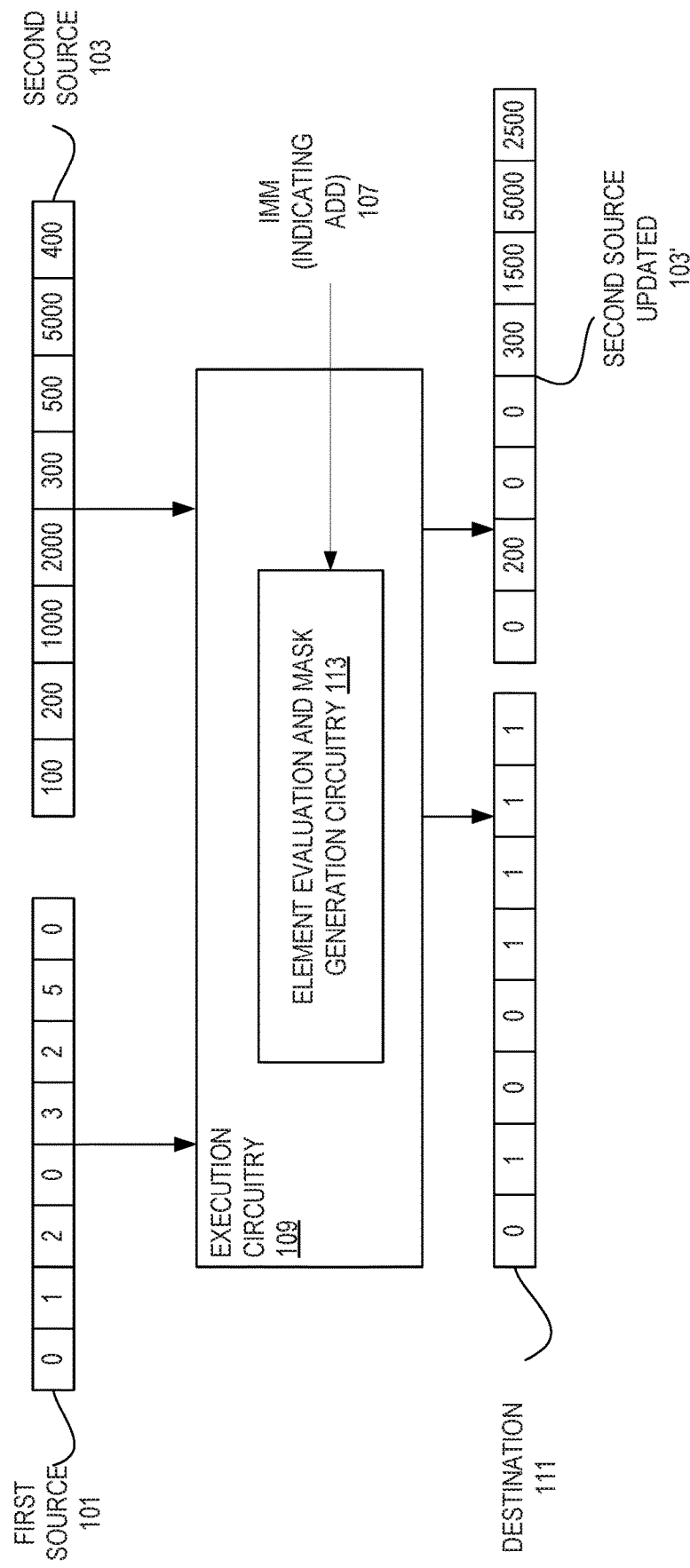
FIG. 3 illustrates an exemplary execution of an instruction to perform a generation of a conflict mask based on an addition reduction operation.

FIG. 3 illustrates an exemplary execution of an instruction to perform a generation of a conflict mask based on an addition reduction operation. Note the same source operands are used as in FIG. 1, but a different immediate 107 is provided which causes a different result to be stored in the identified destination operand 111.

In this illustration, the immediate 107 indicates an addition for the reduction operator. As shown, in the identified first source operand 101 the following data element positions have conflicts: positions 0, 3, and 7 all store 0; and positions 2 and 5 store 2. There are no conflicts at positions 1, 5, and 6 and corresponding data element positions of the destination operand 111 are set to indicate no conflict. For the first conflict (positions 0, 3, and 7), the element evaluation and mask generation circuitry 113 adds data values from corresponding data element positions of the identified second source operand 103. Which data element position of the identified destination operand 111 to write varies depending upon the implementation. In the illustration, the most significant data element position having a conflict is used. As such, a conflict indication is stored in data element position 7 of the identified second source operand 103. Further, in some embodiments, the identified second source operand 103 is updated as identified second source operand 103' to store the result of the addition (2500). However, in other embodiments, the least significant data element position having a conflict is used. Similarly, for the second conflict the addition of the conflicting data elements is indicated in data element position 5 of the identified destination operand 111. Further, in some embodiments, the identified second source operand 103 is updated as identified second source operand 103' to store the result of the addition (1500).

Note the identified destination operand 111 is a writemask in some embodiments, where data element positions are single bits, and is a vector or SIMD register in other embodiments wherein each data element position stores a simple "1" or "0" dependent upon the result of the operation. Note that the storing of a "1" for a "mask" value is flipped for some embodiments such that a "0" would indicate a conflict, etc.

Figure 4:
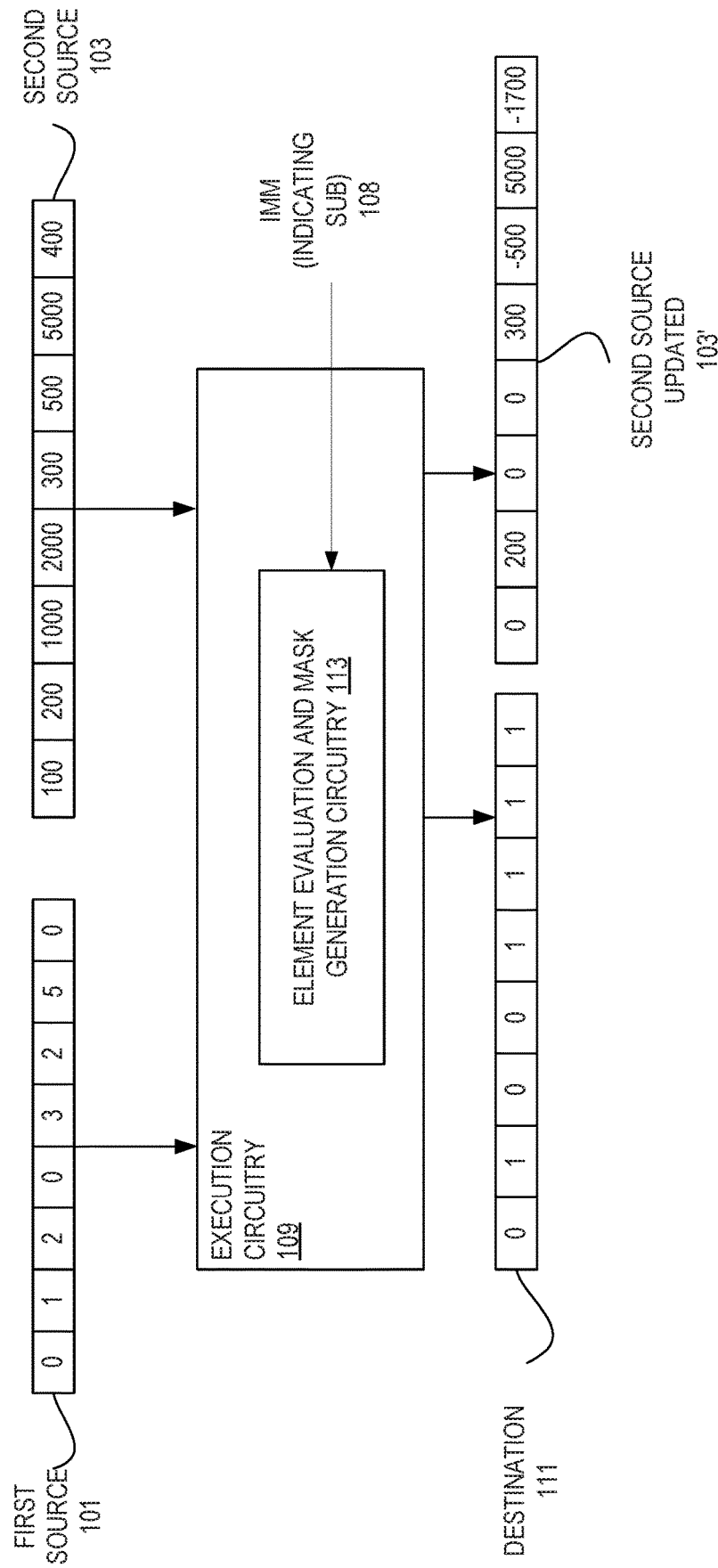
FIG. 4 illustrates an exemplary execution of an instruction to perform a generation of a conflict mask based on a subtraction reduction operation.

FIG. 4 illustrates an exemplary execution of an instruction to perform a generation of a conflict mask based on a subtraction reduction operation. Note the same source operands are used as in FIG. 1, but a different immediate 108 is provided which causes a different result to be stored in the identified destination operand 111.

In this illustration, the immediate 108 indicates a subtraction for the reduction operator. As shown, in the identified first source operand 101 the following data element positions have conflicts: positions 0, 3, and 7 all store 0; and positions 2 and 5 store 2. There are no conflicts at positions 1, 5, and 6 and corresponding data element positions of the destination operand 111 are set to indicate no conflict. For the first conflict (positions 0, 3, and 7), the element evaluation and mask generation circuitry 113 subtracts data values from corresponding data element positions of the identified second source operand 103. Which data element position of the identified destination operand 111 to write varies depending upon the implementation. In the illustration, the most significant data element position having a conflict is used. As such, a conflict indication is stored in data element position 7 of the identified second source operand 103. Further, in some embodiments, the identified second source operand 103 is updated as identified second source operand 103' to store the result of the subtraction (−500). However, in other embodiments, the least significant data element position having a conflict is used. Similarly, for the second conflict the subtraction of the conflicting data elements is indicated in data element position 5 of the identified destination operand 111. Further, in some embodiments, the identified second source operand 103 is updated as identified second source operand 103' to store the result of the subtraction (−1,700).

Note the identified destination operand 111 is a writemask in some embodiments, where data element positions are single bits, and is a vector or SIMD register in other embodiments wherein each data element position stores a simple "1" or "0" dependent upon the result of the operation. Note that the storing of a "1" for a "mask" value is flipped for some embodiments such that a "0" would indicate a conflict, etc.

Note too that other arithmetic operations such as multiplication, etc. may be indicated by the immediate of the instruction, but are not shown for the sake of brevity.

Figure 5:
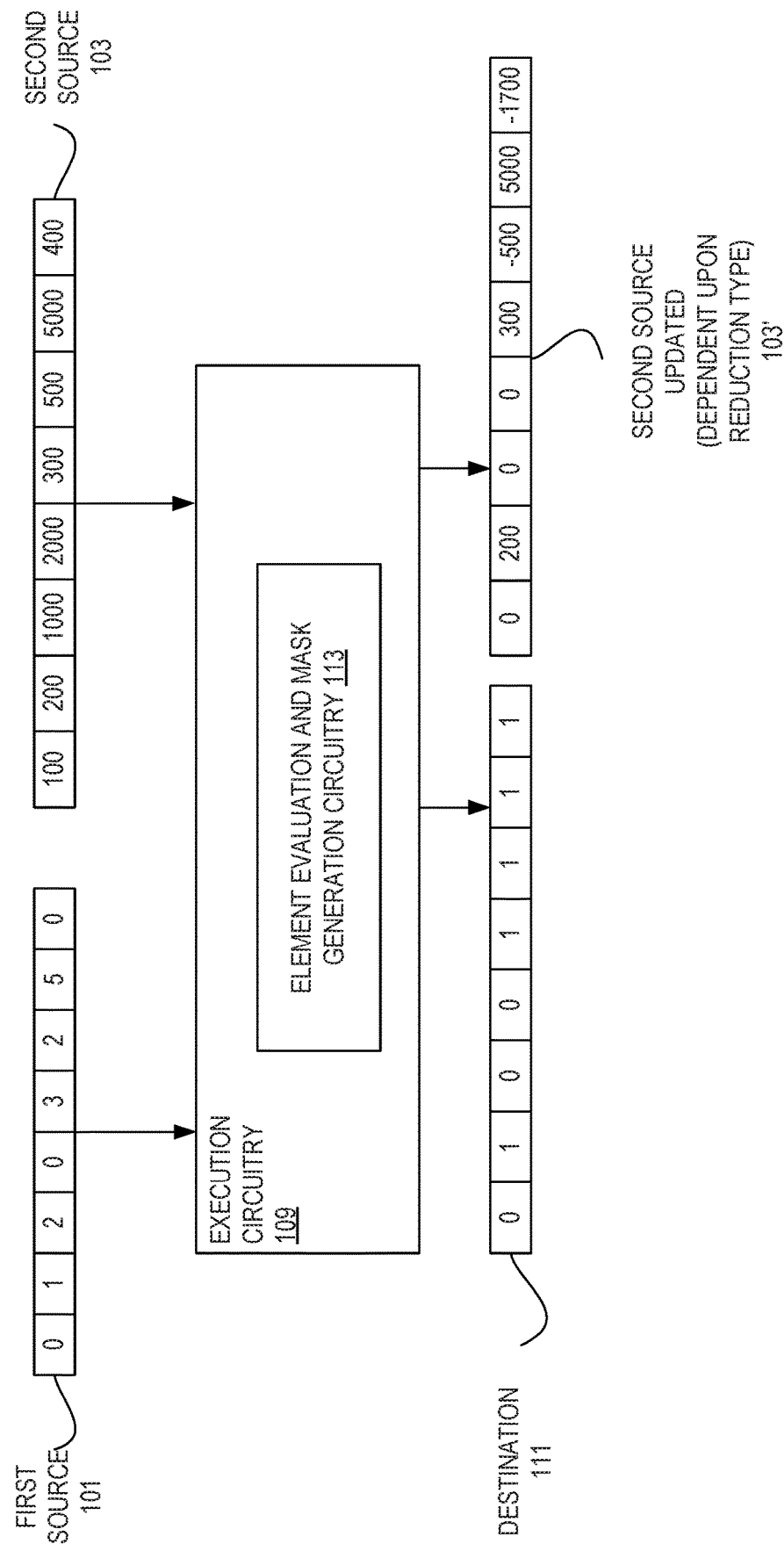
FIG. 5 illustrates an exemplary execution of an instruction to perform a generation of a conflict mask based on a reduction operation.

FIG. 5 illustrates an exemplary execution of an instruction to perform a generation of a conflict mask based on a reduction operation. In this example, a subtraction reduction is used as in FIG. 4, however, the subtraction reduction is noted in the opcode. {REDUCTIONTYPE} would indicate subtraction, max, min, etc. Note the same source operands are used as FIG. 1 and the result(s) are the same as in FIG. 4.

Figure 6:
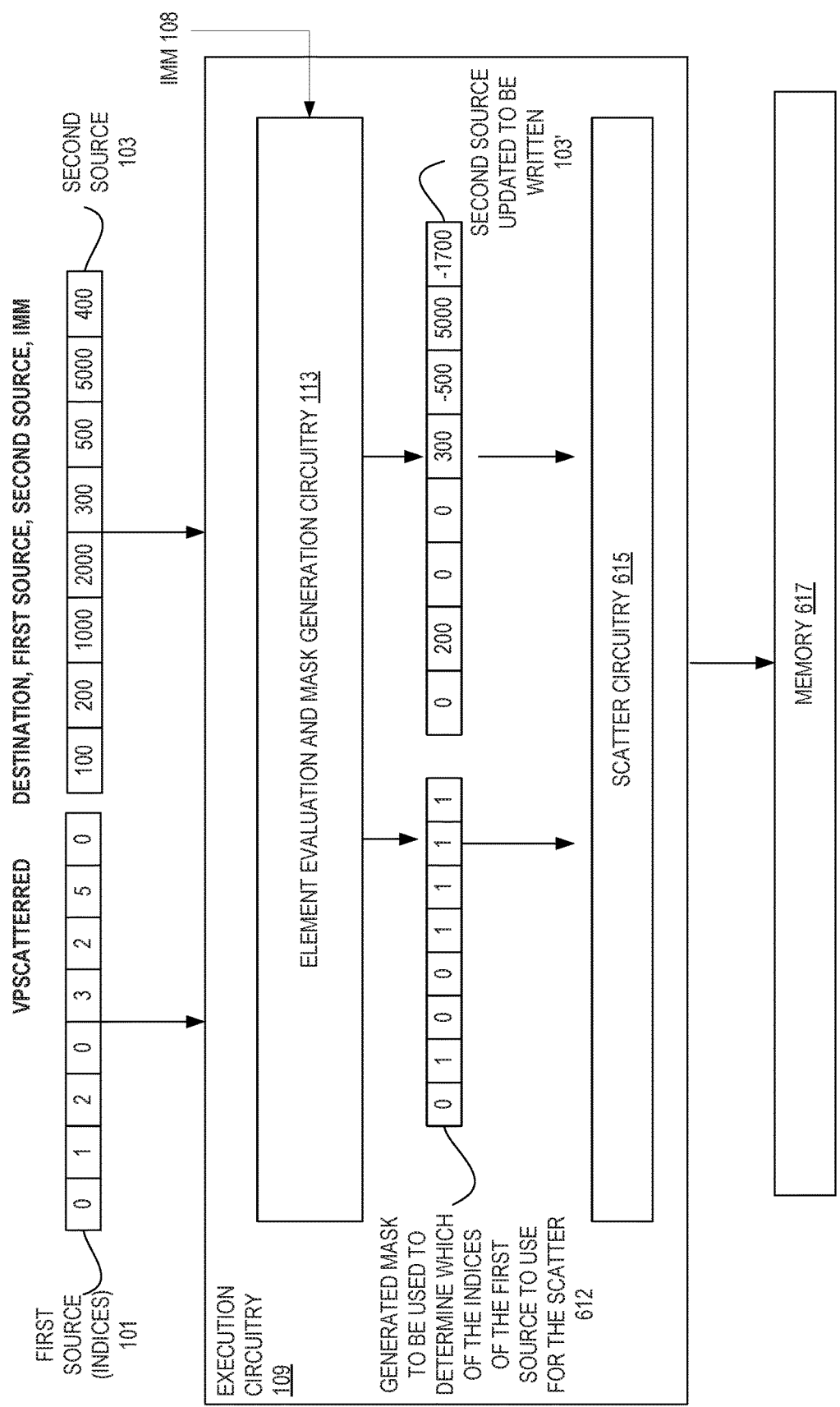
FIG. 6 illustrates an exemplary execution of an instruction to perform a scatter based on a reduction operation.

FIG. 6 illustrates an exemplary execution of an instruction to perform a scatter based on a reduction operation. The instruction format includes fields for an opcode (VPSCATTERRED is an exemplary mnemonic) that indicates a scatter based on a reduction operation is to be performed, one or more fields to be used to generate one or more destination memory addresses, a field to identify a first source operand, a field to identify a second source operand, and a field to store an immediate value. In some embodiments, the identified source operands are packed data operands such as SIMD or vector registers.

In this example, a subtraction reduction is used as in FIG. 4 with the reduction operator being indicated in the immediate 108. Note the same source operands are used as in FIG. 1. As shown, the element evaluation and mask generation circuitry 113 detailed before generates both a mask 612 which determines which of the indices of the first source to use for the scatter address(es) and an update to the values of the identified second source 103 to be scattered according to the scatter address(es). In some embodiments, the updated identified second source 103' is stored as a part of a result of the instruction's execution. In some embodiments, the generated mask is also stored and a field for that destination is utilized in the instruction format.

Scatter circuitry 615 calculates addresses based on the mask 112 and indices and scatters corresponding updated data elements of the identified second source operand 103' using those addresses into memory 607.

Figure 7:
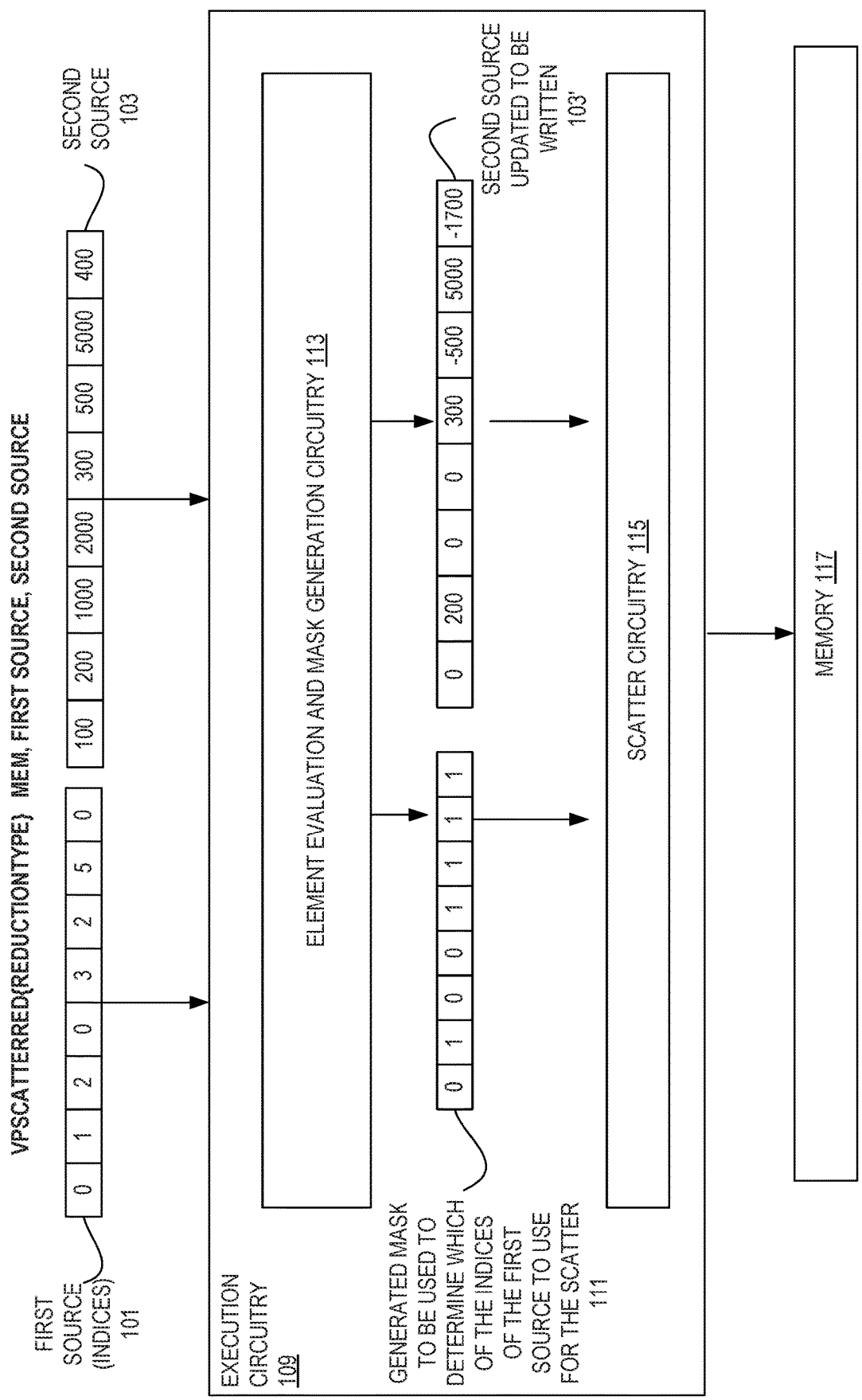
FIG. 7 illustrates an exemplary execution of an instruction to perform a scatter based on a reduction operation.

FIG. 7 illustrates an exemplary execution of an instruction to perform a scatter based on a reduction operation. In this example, using the same reference numbers as FIG. 7, the reduction type is included in the opcode similar to that shown in FIG. 6.

Exemplary Hardware to Execute the Described Instructions

Figure 8:
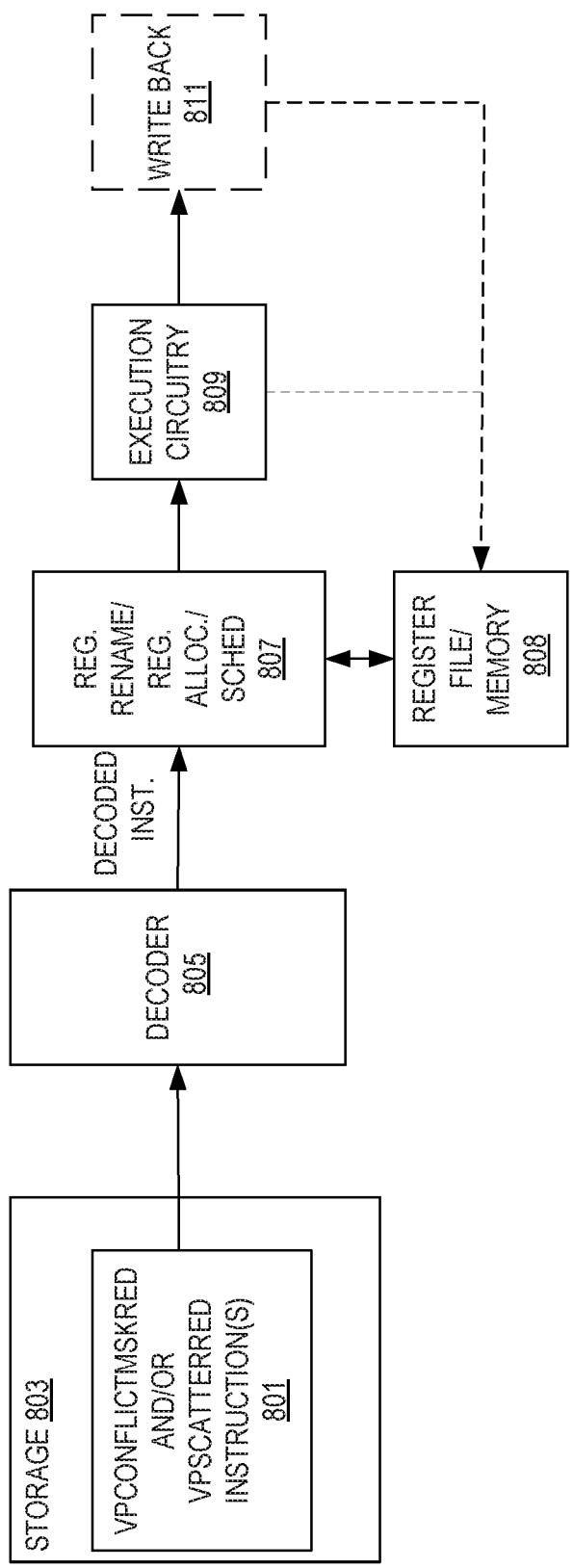
FIG. 8 illustrates an embodiment of hardware to process an instruction such as the instructions detailed herein.

FIG. 8 illustrates an embodiment of hardware to process an instruction such as the instructions detailed herein. As illustrated, storage 801 (such as a disk, memory, etc.) stores the instruction 801 to be executed. Note other embodiments of a processor or core are detailed herein.

The instruction is received by decode circuitry 805. For example, the decode circuitry 805 receives this instruction from fetch logic/circuitry. The instructions include fields as detailed above. In some embodiments, the sources and destination are registers, and in other embodiments one or more are memory locations. The decode circuitry 805 decodes the instruction into one or more operations. In some embodiments, this decoding includes generating a plurality of micro-operations to be performed by execution circuitry (such as execution circuitry). The decode circuitry 805 also decodes instruction prefixes (if used). Note this decoder circuitry 805 and other decoder circuitry discussed herein such as 1040, 1600, etc. provide functionality to decode the new instructions detailed herein. As such, no known decoder is capable of decoding these instructions.

In some embodiments, register renaming, register allocation, and/or scheduling circuitry 807 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 808 store data as operands of the instruction to be operated on by execution circuitry. Exemplary register types include packed data registers, general purpose registers, and floating-point registers.

Execution circuitry executes 809 the decoded instruction as detailed herein. Exemplary detailed execution circuitry was shown in FIGS. 1-7. Write back (retirement) circuitry 811 commits the result of the execution of the decoded instruction. Note the execution circuitry is configurable to execute these new decoded instructions.

Exemplary Formats of the Uniformity-Based Instructions

An embodiment of a format for a reduction-based conflict mask generation instruction is VPCONFLICTMSKRED{B/W/D/Q} DSTREG, SRC1, SRC2, IMM. In some embodiments, VPCONFLICTMSKRED{B/W/D/Q} is the opcode mnemonic of the instruction and B/W/D/Q are data element sizes. DSTREG is a field for the packed data destination register operand. SRC1 and SRC2 are fields for the sources such as packed data registers and/or memory. IMM is an immediate value to store the reduction type.

An embodiment of a format for a reduction-based conflict mask generation instruction is VPCONFLICTMSKRED{REDUCTIONTYPE}{B/W/D/Q} DSTREG, SRC1, SRC2. In some embodiments, VPCONFLICTMSKRED{REDUCTIONTYPE}{B/W/D/Q} is the opcode mnemonic of the instruction where the reduction type is indicated in REDUCTIONTYPE and B/W/D/Q are data element sizes. DSTREG is a field for the packed data destination register operand. SRC1 and SRC2 are fields for the sources such as packed data registers and/or memory.

An embodiment of a format for a reduction-based conflict mask generation instruction is VPSCATTERED{B/W/D/Q} MEM, SRC1, SRC2, IMM. In some embodiments, VPSCATTERED{B/W/D/Q} is the opcode mnemonic of the instruction and B/W/D/Q are data element sizes. MEM is one or more fields used to generate one or more destination memory addresses. SRC1 and SRC2 are fields for the sources such as packed data registers. IMM is an immediate value to store the reduction type.

An embodiment of a format for a reduction-based conflict mask generation instruction is VPSCATTERED{REDUCTIONTYPE}{B/W/D/Q} MEM, SRC1, SRC2. In some embodiments, VPSCATTERED{REDUCTIONTYPE}{B/W/D/Q} is the opcode mnemonic of the instruction where the reduction type is indicated in REDUCTIONTYPE and B/W/D/Q are data element sizes. MEM is one or more fields used to generate one or more destination memory addresses. SRC1 and SRC2 are fields for the sources such as packed data registers.

In some embodiments, one or more of the fields or data elements sizes correspond to one or more of fields 1320, 1371, 1364, 1345, 1372, 1350, 1363A or B, etc.

In some embodiments, the instruction includes a field for a writemask register operand (k) (e.g., VPCONFLICTMSKRE{k} DSTREG, SRC1, SRC2). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the destination operand. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of an opmask register, MAX_KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2). a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative the masking can be used for zeroing instead of merging, so that the masked-out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, a SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, a SIB type memory operand may include an encoding identifying an index register. Each element of the index register may specify an index or offset value usable to compute, from the base address, an address of a respective destination location within a block of potential destination locations. In one embodiment, a SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, a SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, a SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of a Uniformity-Based Logical or Arithmetic Instruction FIG. 9 illustrates an embodiment of method performed by a processor to process a reduction-based mask generation instruction. For example, the processor components of FIG. 8, a pipeline as detailed below, etc. performs this method.

At 901, an instruction is fetched. The instruction including a field for an opcode to indicate a reduction-based mask generation operation is to be performed, a field to identify a first packed data source operand, a field to identify a second packed data source operand, a field to identify a destination operand to store the generated mask, and a field to store an immediate. The opcode indicating that the generating of a mask according to a reduction operation specified by the immediate is to be performed by determining whether there are conflicts between data elements of the identified first packed data source operand and 1) for each data element position where there is not a conflict, setting a corresponding data element position in the identified destination operand; 2) for each conflict, applying the reduction operation to data elements of corresponding data elements of the identified second packed data source operand to determine which data element position to set in the identified destination operand and setting said position; and 3) in some embodiments, updating the identified second packed data source operand according to the reduction operation.

The fetched instruction is decoded at 903. For example, the fetched instruction is decoded by decode circuitry such as that detailed herein. In some embodiments, this decoded instruction comprises a plurality of micro-operations.

Data values associated with the source operands of the decoded instruction are retrieved at 905 and the decoded instruction is scheduled (as needed). For example, when one or more of the source operands are memory operands, the data from the indicated memory location is retrieved.

In some embodiments, at 907, the decoded instruction is scheduled.

At 909, the decoded instruction is executed by execution circuitry (hardware) such as that detailed herein. The execution will cause execution circuitry to generate the mask according to a reduction operation specified by the immediate by determining whether there are conflicts between data elements of the identified first packed data source operand and 1) for each data element position where there is not a conflict, setting a corresponding data element position in the identified destination operand; 2) for each conflict, applying the reduction operation to data elements of corresponding data elements of the identified second packed data source operand to determine which data element position to set in the identified destination operand and setting said position; and 3) in some embodiments, updating the identified second packed data source operand according to the reduction operation.

In some embodiments, the instruction is committed or retired at 911.

FIG. 10 illustrates an embodiment of method performed by a processor to process a reduction-based mask generation instruction. For example, the processor components of FIG. 8, a pipeline as detailed below, etc. performs this method.

At 1001, an instruction is fetched. The instruction including a field for an opcode to indicate a reduction-based mask generation operation is to be performed, a field to identify a first packed data source operand, a field to identify a second packed data source operand, a field to identify a destination operand to store the generated mask. The opcode indicating the reduction operation and that a generating of a mask according to a reduction operation is to be performed by determining whether there are conflicts between data elements of the identified first packed data source operand and 1) for each data element position where there is not a conflict, setting a corresponding data element position in the identified destination operand; 2) for each conflict, applying the reduction operation to data elements of corresponding data elements of the identified second packed data source operand to determine which data element position to set in the identified destination operand and setting said position; and 3) in some embodiments, updating the identified second packed data source operand according to the reduction operation.

The fetched instruction is decoded at 1003. For example, the fetched instruction is decoded by decode circuitry such as that detailed herein. In some embodiments, this decoded instruction comprises a plurality of micro-operations.

Data values associated with the source operands of the decoded instruction are retrieved at 1005 and the decoded instruction is scheduled (as needed). For example, when one or more of the source operands are memory operands, the data from the indicated memory location is retrieved.

In some embodiments, at 1007, the decoded instruction is scheduled.

At 1009, the decoded instruction is executed by execution circuitry (hardware) such as that detailed herein. The execution will cause execution circuitry to generate the mask according to a reduction operation specified by the opcode by determining whether there are conflicts between data elements of the identified first packed data source operand and 1) for each data element position where there is not a conflict, setting a corresponding data element position in the identified destination operand; 2) for each conflict, applying the reduction operation to data elements of corresponding data elements of the identified second packed data source operand to determine which data element position to set in the identified destination operand and setting said position; and 3) in some embodiments, updating the identified second packed data source operand according to the reduction operation.

FIG. 11 illustrates an embodiment of method performed by a processor to process a reduction-based SCATTER instruction. For example, the processor components of FIG. 8, a pipeline as detailed below, etc. performs this method.

At 1101, an instruction is fetched. The instruction including a field for an opcode to indicate a reduction-based scatter operation is to be performed, a field to identify a first packed data source operand, a field to identify a second packed data source operand, one or more fields to be used to generate one or more destination address(es), and a field to store an immediate. The opcode is to indicate to execution circuitry to scatter to memory data elements of selected data element positions of the identified second packed using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the immediate to data elements of corresponding data elements of the identified second packed data source operand to determine which data element position to set in the identified destination operand and setting said position; 3) in some embodiments, updating the identified second packed data source operand according to the reduction operation; and 4) scattering data elements of the (updated) identified second packed data source operand at addresses generated using sib addressing, wherein the index of the sib address is determined by applying the generated mask to the indices of the first packed data source operand.

The fetched instruction is decoded at 1103. For example, the fetched instruction is decoded by decode circuitry such as that detailed herein. In some embodiments, this decoded instruction comprises a plurality of micro-operations.

Data values associated with the source operands of the decoded instruction are retrieved at 1105 and the decoded instruction is scheduled (as needed). For example, when one or more of the source operands are memory operands, the data from the indicated memory location is retrieved.

In some embodiments, at 1107, the decoded instruction is scheduled.

At 1109, the decoded instruction is executed by execution circuitry (hardware) such as that detailed herein. The execution will cause execution circuitry to scatter to memory data elements of selected data element positions of the identified second packed using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the immediate to data elements of corresponding data elements of the identified second packed data source operand to determine which data element position to set in the identified destination operand and setting said position; 3) in some embodiments, updating the identified second packed data source operand according to the reduction operation; and 4) scattering data elements of the (updated) identified second packed data source operand at addresses generated using sib addressing, wherein the index of the sib address is determined by applying the generated mask to the indices of the first packed data source operand is operation.

FIG. 11 illustrates an embodiment of method performed by a processor to process a reduction-based SCATTER instruction. For example, the processor components of FIG. 8, a pipeline as detailed below, etc. performs this method.

At 1201, an instruction is fetched. The instruction including a field for an opcode to indicate a reduction-based scatter operation is to be performed, a field to identify a first packed data source operand, a field to identify a second packed data source operand, one or more fields to be used to generate one or more destination address(es). The opcode is to indicate a reduction operation to be used and that execution circuitry is to a scatter to memory data elements of selected data element positions of the identified second packed using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the opcode to data elements of corresponding data elements of the identified second packed data source operand to determine which data element position to set in the identified destination operand and setting said position; 3) in some embodiments, updating the identified second packed data source operand according to the reduction operation; and 4) scattering data elements of the (updated) identified second packed data source operand at addresses generated using sib addressing, wherein the index of the sib address is determined by applying the generated mask to the indices of the first packed data source operand.

The fetched instruction is decoded at 1203. For example, the fetched instruction is decoded by decode circuitry such as that detailed herein. In some embodiments, this decoded instruction comprises a plurality of micro-operations.

Data values associated with the source operands of the decoded instruction are retrieved at 1205 and the decoded instruction is scheduled (as needed). For example, when one or more of the source operands are memory operands, the data from the indicated memory location is retrieved.

In some embodiments, at 1207, the decoded instruction is scheduled.

At 1209, the decoded instruction is executed by execution circuitry (hardware) such as that detailed herein. The execution will cause execution circuitry to scatter to memory data elements of selected data element positions of the identified second packed using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the opcode to data elements of corresponding data elements of the identified second packed data source operand to determine which data element position to set in the identified destination operand and setting said position; 3) in some embodiments, updating the identified second packed data source operand according to the reduction operation; and 4) scattering data elements of the (updated) identified second packed data source operand at addresses generated using sib addressing, wherein the index of the sib address is determined by applying the generated mask to the indices of the first packed data source operand is operation.

Detailed below are exemplary instruction formats, architectures, and systems that may be utilized for the above detailed instructions. For example, an exemplary pipeline supporting the instructions is detailed that includes circuitry to perform the methods detailed herein.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 13A is a block diagram illustrating an exemplary instruction format according to embodiments of the invention. FIG. 13A shows a instruction format 1300 that is specific in the sense that it specifies the location, size, interpretation, and order of the fields, as well as values for some of those fields. The instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 1302—is encoded in a four-byte form.

Format Field 1382 (EVEX Byte 0, bits [7:0])—the first byte (EVEX Byte 0) is the format field 1382 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 1320 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]—U)—If EVEX.U=0, it indicates class A (support merging-write-masking) or EVEX.U0; if EVEX.U=1, it indicates class B (support zeroing and merging-writemasking) or EVEX.U1.

Prefix encoding field 1325 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1353 (EVEX byte 3, bit [7]—EH; also known as EVEX.EH, EVEX.rs, EVEX.RL, EVEX.writemask control, and EVEX.N; also illustrated with α)—its content distinguishes which one of the different augmentation operation types are to be performed.

Beta field 1355 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—distinguishes which of the operations of a specified type are to be performed.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 1371 (EVEX byte 3, bits [2:0]-kkk)—its content specifies the index of a register in the writemask registers. In one embodiment of the invention, the specific value EVEX.kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 1371 allows for partial vector operations, including loads, stores, arithmetic, logical, etc. While embodiments of the invention are described in which the writemask field's 1371 content selects one of a number of writemask registers that contains the writemask to be used (and thus the writemask field's 1371 content indirectly identifies that masking to be performed), alternative embodiments instead or additional allow the mask write field's 1371 content to directly specify the masking to be performed.

Real Opcode Field 1330 (Byte 4) is also known as the opcode byte. Part of the opcode is specified in this field.

MOD R/M Field 1340 (Byte 5) includes MOD field 1342, register index field 1344, and RIM field 1346. The MOD field's 1342 content distinguishes between memory access and non-memory access operations. The role of register index field 1344 can be summarized to two situations: encoding either the destination register operand or a source register operand, or be treated as an opcode extension and not used to encode any instruction operand. The content of register index field 1344, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of RIM field 1346 may include the following: encoding the instruction operand that references a memory address, or encoding either the destination register operand or a source register operand.

Scale, Index, Base (SIB) Byte (Byte 6)—The scale field's 1350 content allows for the scaling of the index field's content for memory address generation (e.g., for address generation that uses $2^{scale}$*index+base). SIB.xxx 1354 and SIB.bbb 1356—the contents of these fields have been previously referred to with regard to the register indexes Xxxx and Bbbb.

Displacement field 1363A (Bytes 7-10)—when MOD field 1342 contains 10, bytes 7-10 are the displacement field 1363A, and it works the same as the legacy 32-bit displacement (disp32) and works at byte granularity. This may be used as part of memory address generation (e.g., for address generation that uses $2^{scale}$*index+base+displacement).

Displacement factor field 1363B (Byte 7)—when MOD field 1342 contains 01, byte 7 is the displacement factor field 1363B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1363B is a reinterpretation of disp8; when using displacement factor field 1363B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1363B substitutes the legacy x86 instruction set 8-bit displacement. Thus, the displacement factor field 1363B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 allows for the specification of an immediate. This field is optional in the sense that is it not present in an implementation of the generic vector friendly format that does not support immediate and it is not present in instructions that do not use an immediate.

Full Opcode Field

FIG. 13B is a block diagram illustrating the fields of the instruction format 1300 that make up the full opcode field 1374 according to one embodiment of the invention. Specifically, the full opcode field 1374 includes the format field 1382, the base operation field 1343, and the data element width (W) field 1363. The base operation field 1343 includes the prefix encoding field 1325, the opcode map field 1315, and the real opcode field 1330.

Register Index Field

FIG. 13C is a block diagram illustrating the fields of the format 1300 that make up the register index field 1345 according to one embodiment of the invention. Specifically, the register index field 1345 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
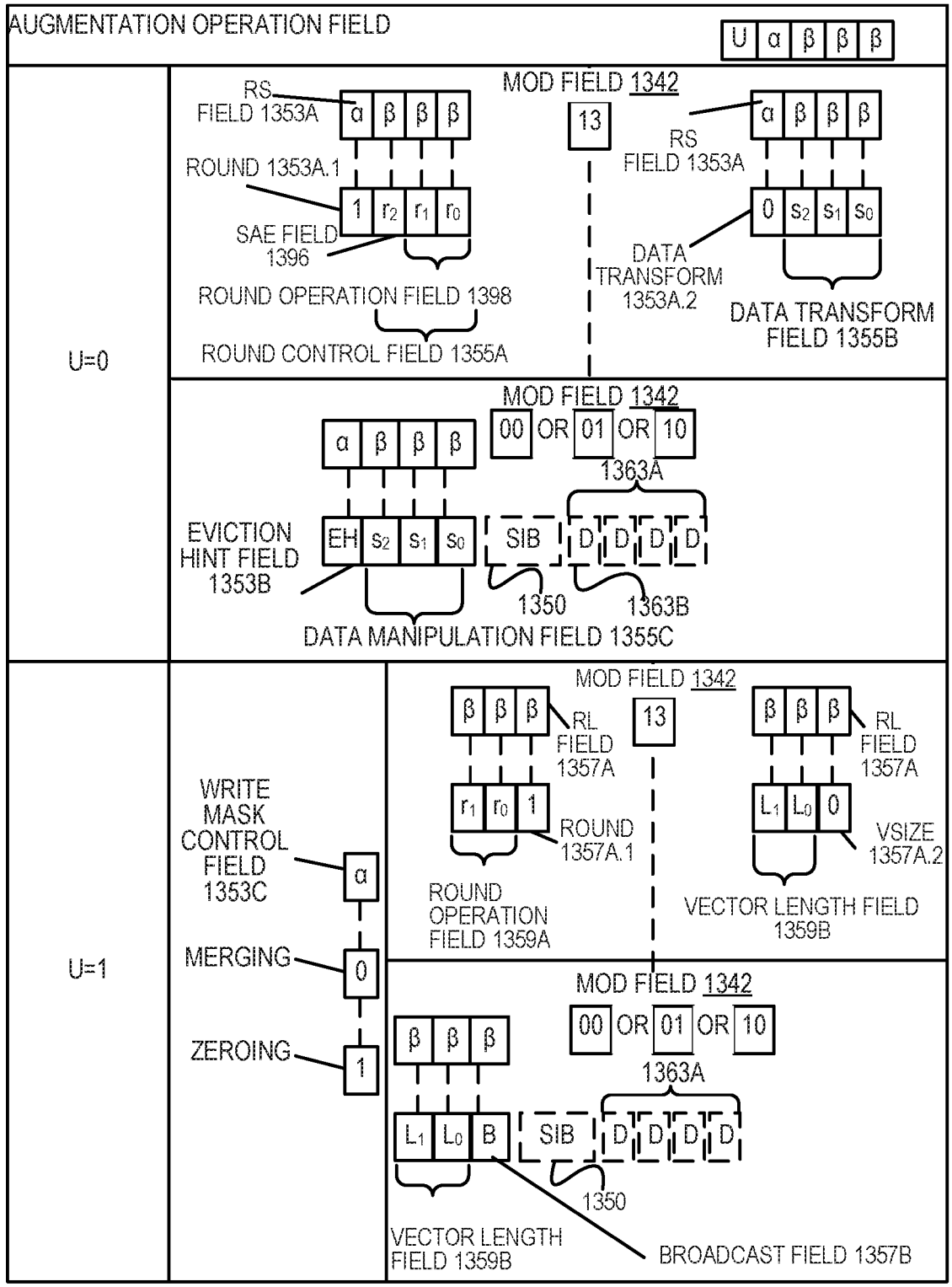
FIG. 13D is a block diagram illustrating the fields of the instruction format that make up the augmentation operation field according to one embodiment of the invention.

FIG. 13D is a block diagram illustrating the fields of the instruction format 1300 that make up an augmentation operation field according to one embodiment of the invention. When the class (U) field 1368 contains 0, it signifies EVEX.U0 (class A 1368A); when it contains 1, it signifies EVEX.U1 (class B 1368B). When U=0 and the MOD field 1342 contains 11 (signifying a no memory access operation), the alpha field 1353 (EVEX byte 3, bit [7]—EH) is interpreted as the rs field 1353A. When the rs field 1353A contains a 1 (round 1353A.1), the beta field 1355 (EVEX byte 3, bits [6:4]—SSS) is interpreted as the round control field 1355A. The round control field 1355A includes a one bit SAE field 1396 and a two bit round operation field 1398. When the rs field 1353A contains a 0 (data transform 1353A.2), the beta field 1355 (EVEX byte 3, bits [6:4]—SSS) is interpreted as a three bit data transform field 1355B. When U=0 and the MOD field 1342 contains 00, 01, or 10 (signifying a memory access operation), the alpha field 1353 (EVEX byte 3, bit [7]—EH) is interpreted as the eviction hint (EH) field 1353B and the beta field 1355 (EVEX byte 3, bits [6:4]—SSS) is interpreted as a three bit data manipulation field 1355C.

When U=1, the alpha field 1353 (EVEX byte 3, bit [7]—EH) is interpreted as the writemask control (Z) field 1353C. When U=1 and the MOD field 1342 contains 11 (signifying a no memory access operation), part of the beta field 1355 (EVEX byte 3, bit [4]—$S_0$) is interpreted as the RL field 1357A; when it contains a 1 (round 1357A.1) the rest of the beta field 1355 (EVEX byte 3, bit [6:5]—$S_{2-1}$) is interpreted as the round operation field 1359A, while when the RL field 1357A contains a 0 (VSIZE 1357.A2) the rest of the beta field 1355 (EVEX byte 3, bit [6:5]—$S_{2-1}$) is interpreted as the vector length field 1359B (EVEX byte 3, bit [6-5]—$L_{1-0}$). When U=1 and the MOD field 1342 contains 00, 01, or 10 (signifying a memory access operation), the beta field 1355 (EVEX byte 3, bits [6:4]—SSS) is interpreted as the vector length field 1359B (EVEX byte 3, bit [6-5]—$L_{1-0}$) and the broadcast field 1357B (EVEX byte 3, bit [4]—B).

Exemplary Register Architecture

Figure 14:
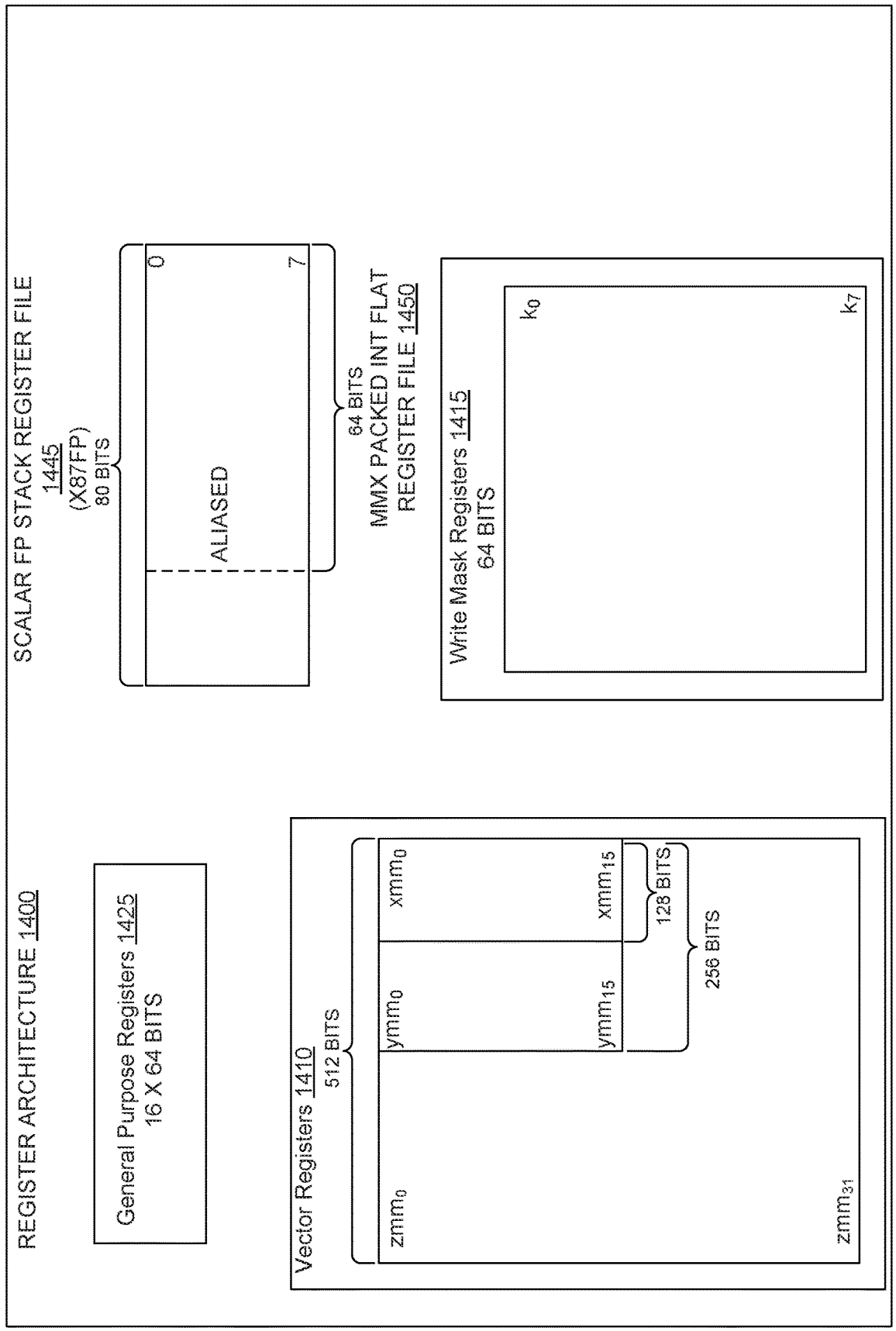
FIG. 14 is a block diagram of a register architecture according to one embodiment of the invention.
Figure 16B:
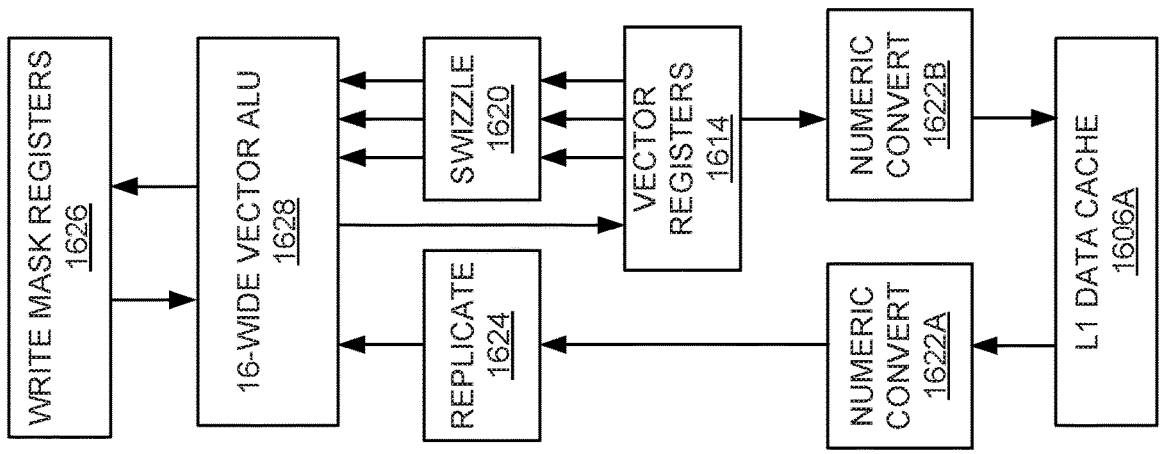
FIGS. 16A-B illustrate a block diagram of a more specific exemplary in-order core architecture, which core would be one of several logic blocks (including other cores of the same type and/or different types) in a chip.
Figure 16A:
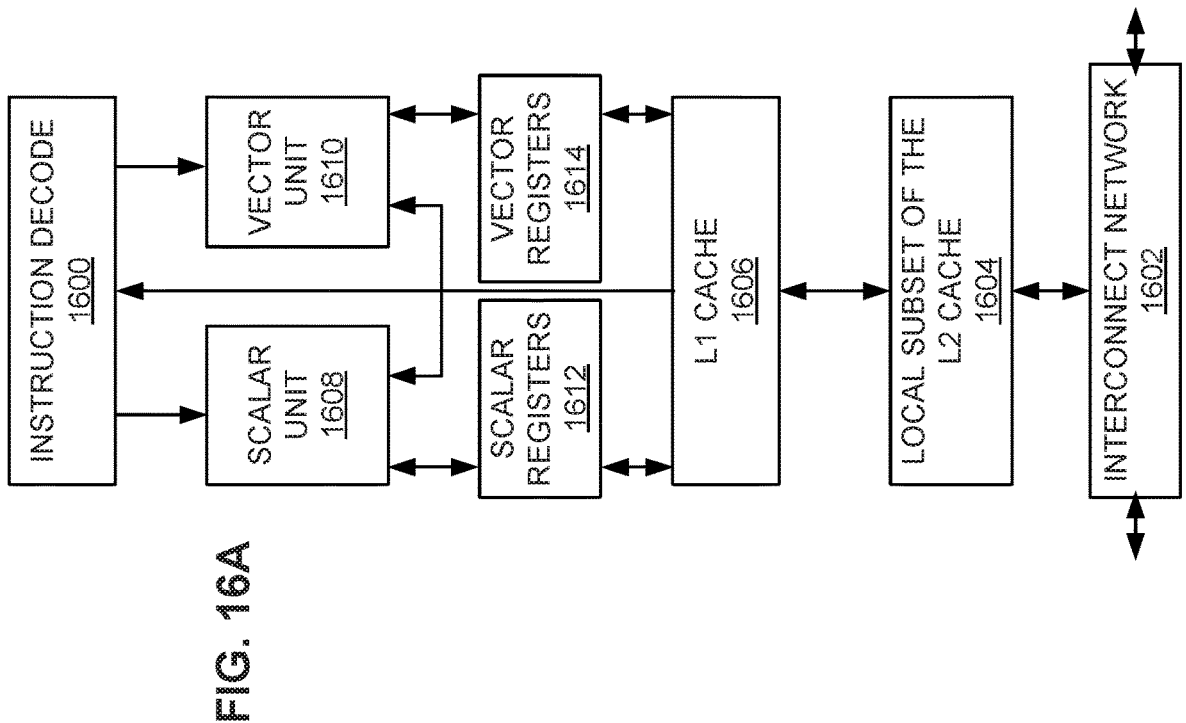
Figure 17:
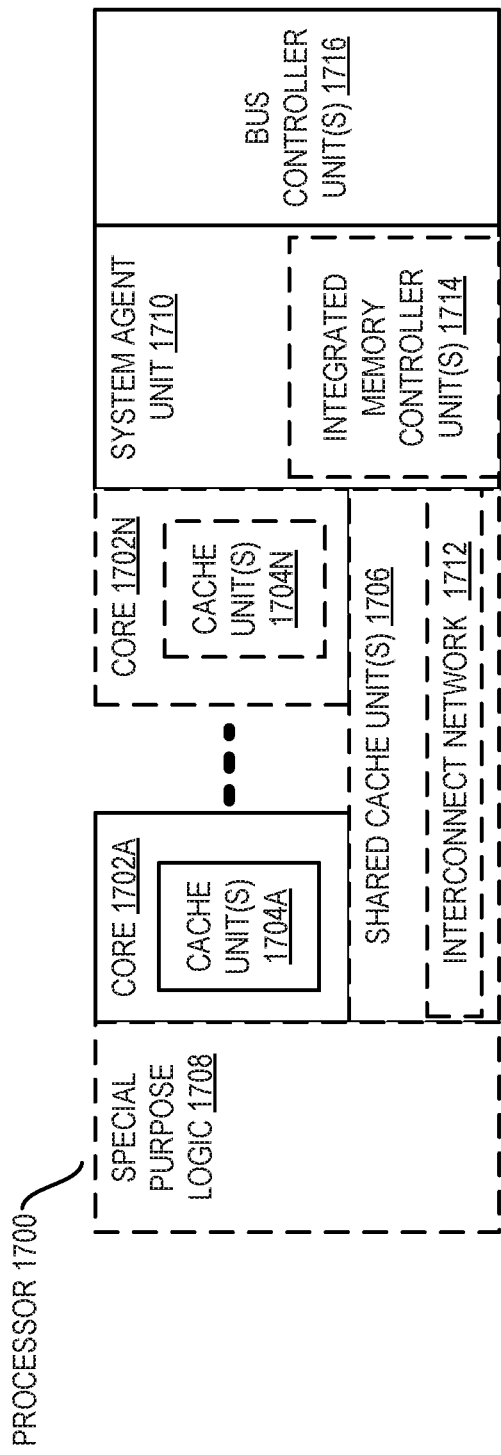
FIG. 17 is a block diagram of a processor that may have more than one core, may have an integrated memory controller, and may have integrated graphics according to embodiments of the invention.
Figure 18:
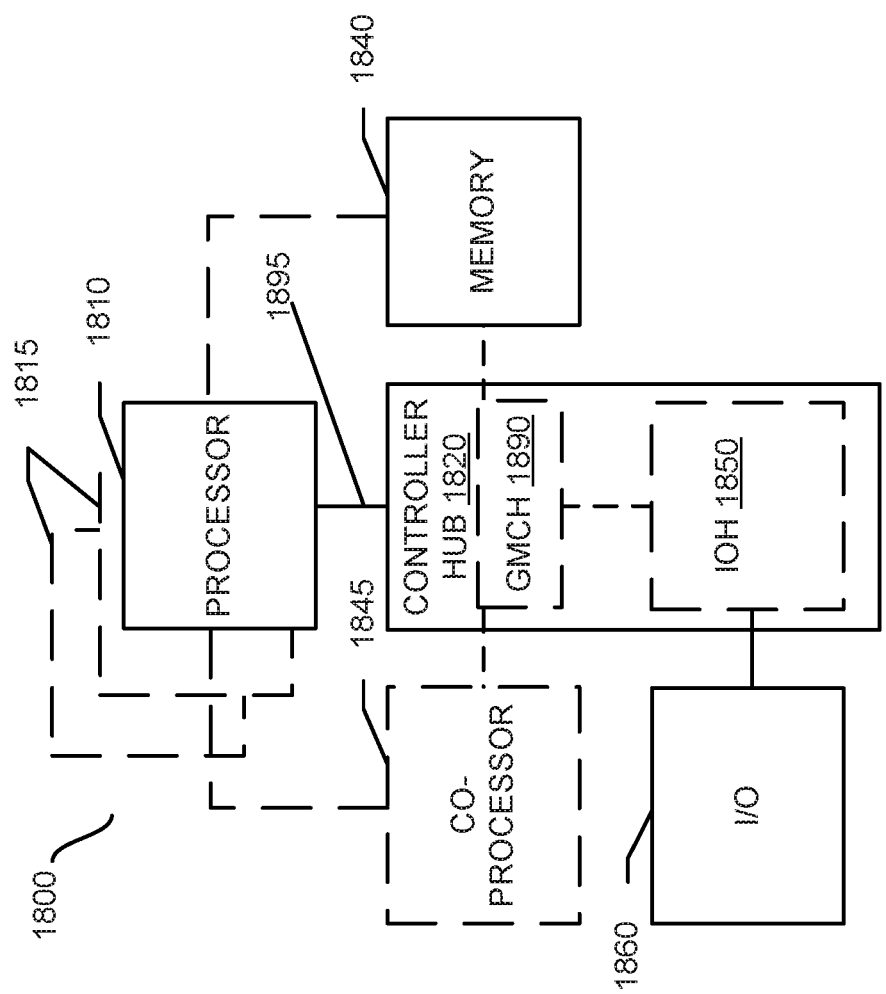
FIG. 18 shown a block diagram of a system in accordance with one embodiment of the present invention.
Figure 19:
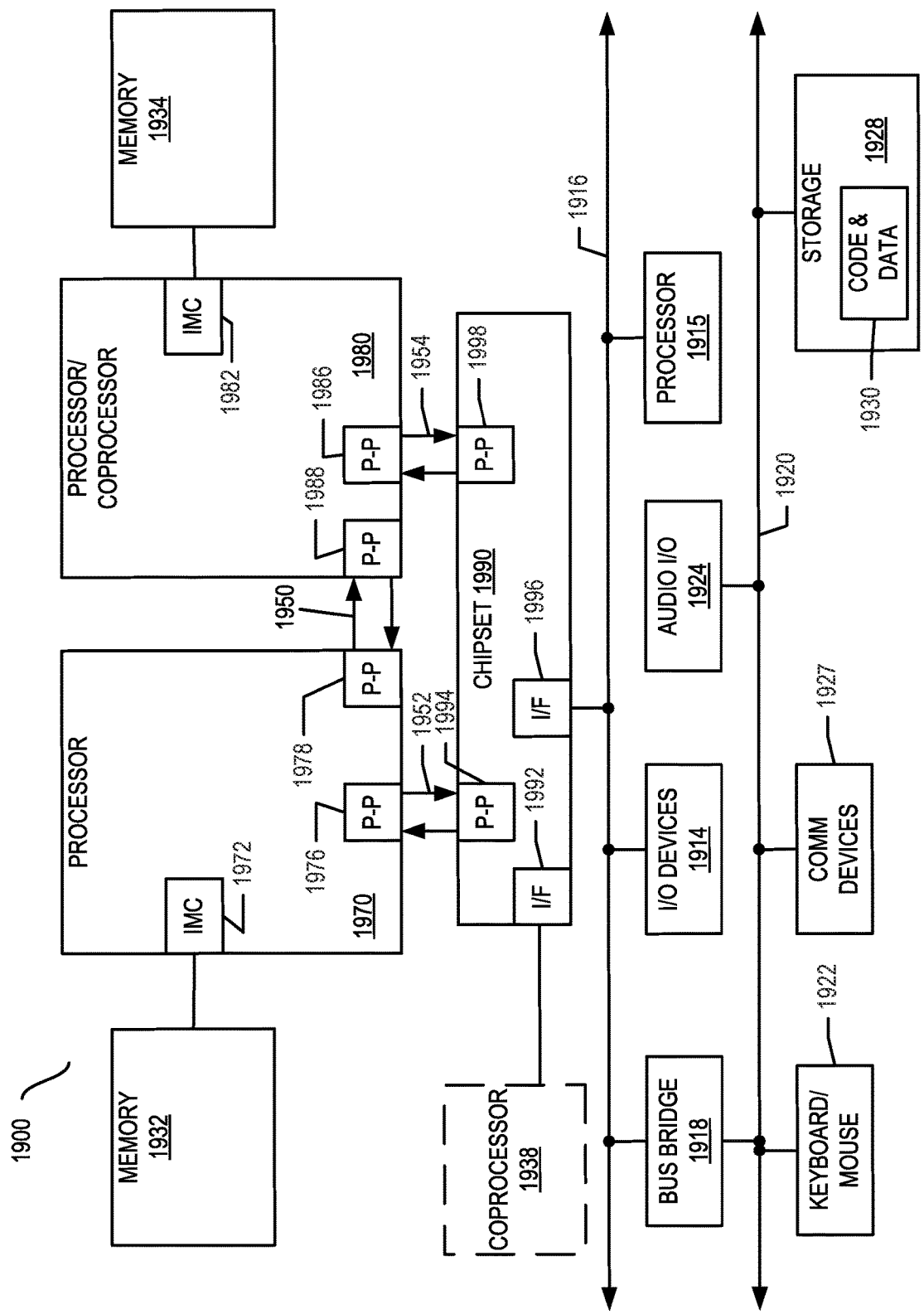
FIG. 19 is a block diagram of a first more specific exemplary system in accordance with an embodiment of the present invention.
Figure 20:
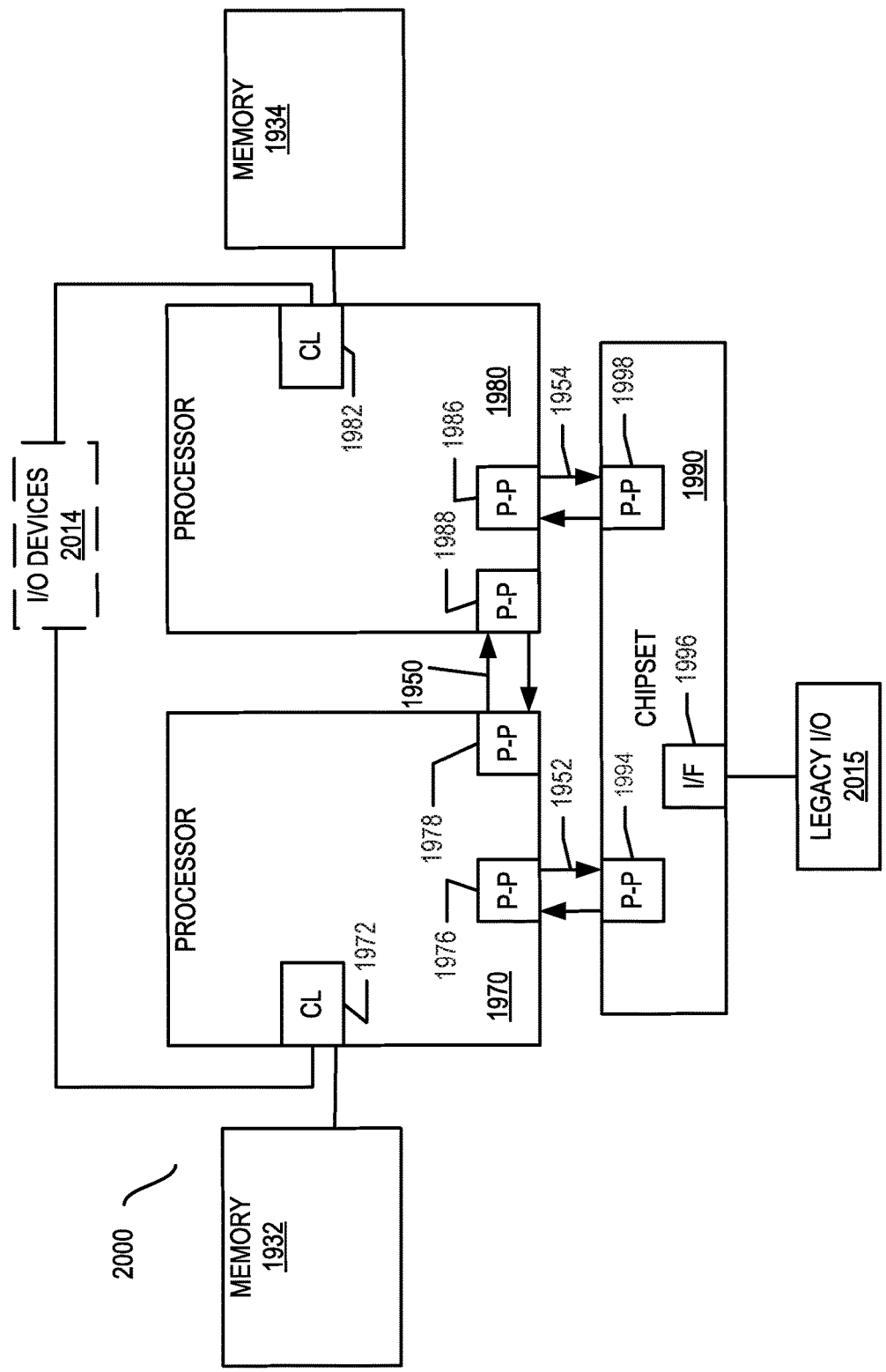
FIG. 20 is a block diagram of a second more specific exemplary system in accordance with an embodiment of the present invention.
Figure 21:
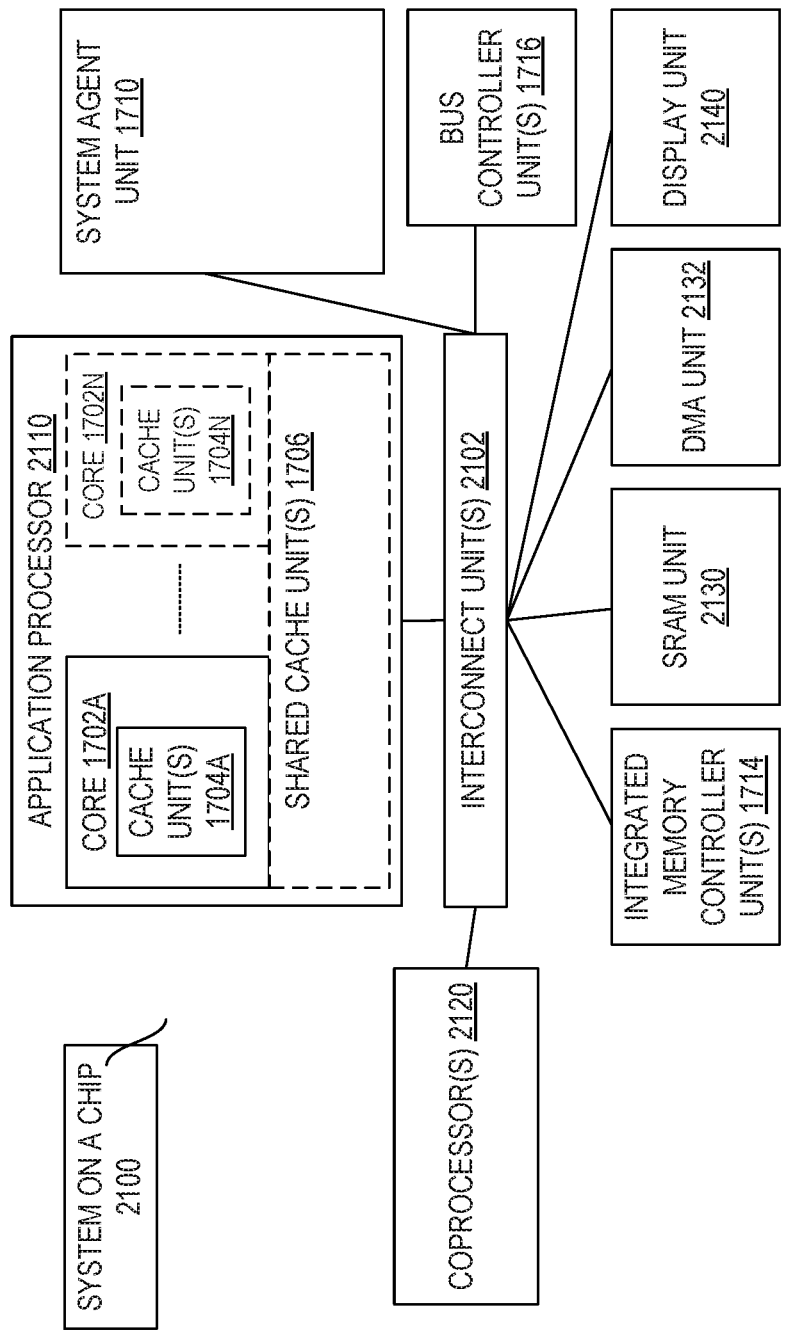
FIG. 21 is a block diagram of a SoC in accordance with an embodiment of the present invention.
Figure 22:
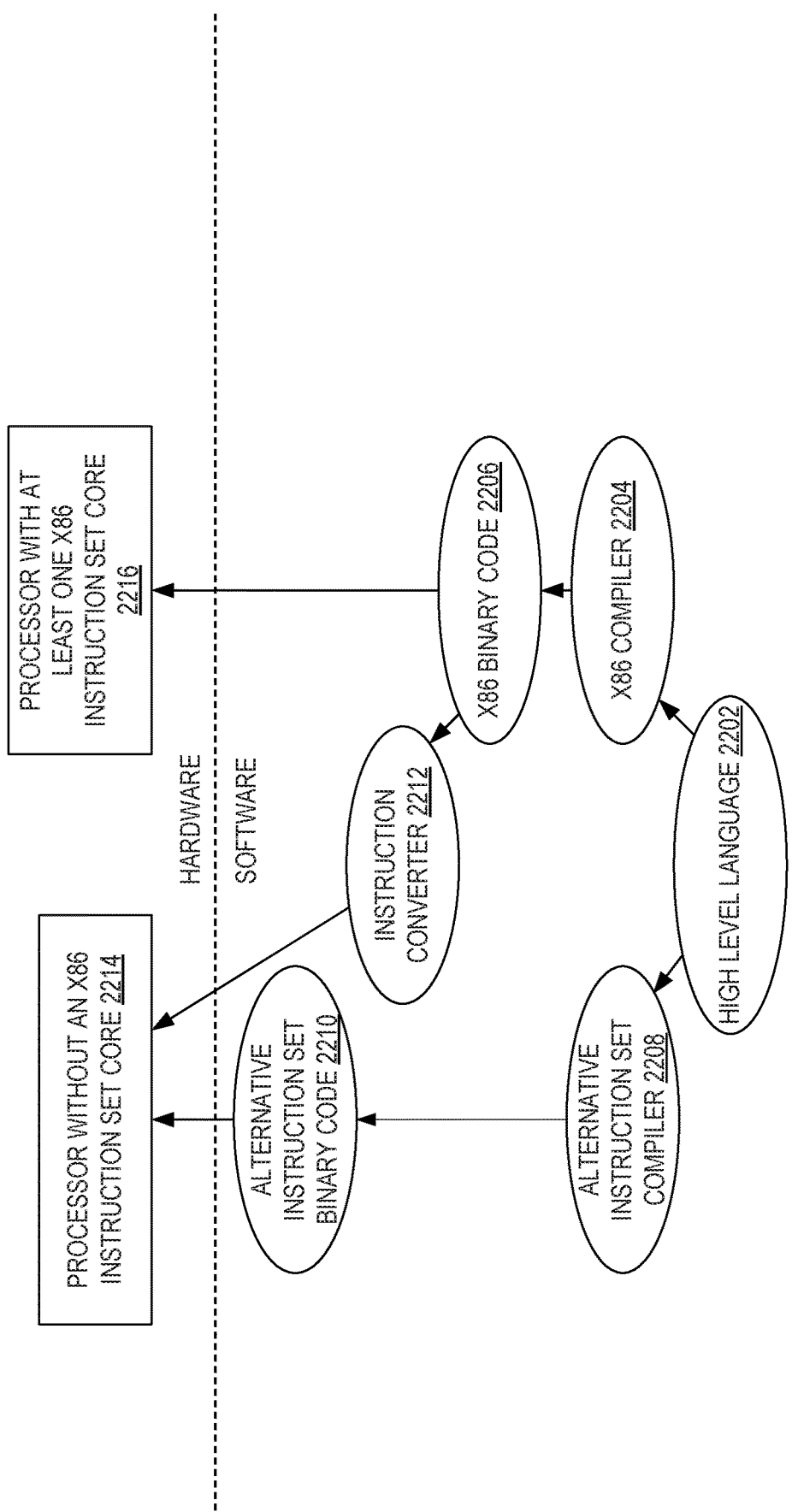
FIG. 22 is a block diagram contrasting the use of a software instruction converter to convert binary instructions in a source instruction set to binary instructions in a target instruction set according to embodiments of the invention.

FIG. 14 is a block diagram of a register architecture 1400 according to one embodiment of the invention. In the embodiment illustrated, there are 32 vector registers 1410 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the instruction format 1300 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 1415—in the embodiment illustrated, there are 8 writemask registers (k0 through k7), each 64 bits in size. In an alternate embodiment, the writemask registers 1415 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a writemask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

Additionally, some exemplary embodiments include, but are not limited to:

Example 1

An apparatus comprising:

decode circuitry to decode a single instruction, the instruction including a field for an opcode to indicate a reduction-based mask generation operation is to be performed, a field to identify a first packed data source operand, a field to identify a second packed data source operand, and a field to identify a destination operand to store reduction-based generated mask;

execution circuitry to execute the decoded instruction according to a reduction operation specified by the instruction by determining whether there are conflicts between data elements of the identified first packed data source operand and for each data element position where there is not a conflict, setting a corresponding data element position in the identified destination operand; and for each conflict, applying the reduction operation to data elements of corresponding data elements of the identified second packed data source operand to determine which data element position to set in the identified destination operand and setting said position.

Example 2

The apparatus of example 1, wherein the reduction operation is determined by an immediate value of the instruction.

Example 3

The apparatus of example 1, wherein the reduction operation is determined by the opcode of the instruction.

Example 4

The apparatus of any of examples 1-3, further comprising: the execution circuitry to update the identified second packed data source operand according to the reduction operation.

Example 5

The apparatus of any of examples 1-4, wherein the reduction operation is one of minimum, maximum, or arithmetic.

Example 6

The apparatus of any of examples 1-5, wherein the identified first and second packed data source operands are registers.

Example 7

The apparatus of any of examples 1-6, wherein the identified destination operand is a writemask register.

Example 8

A method comprising:

decoding a single instruction, the instruction including a field for an opcode to indicate a reduction-based mask generation operation is to be performed, a field to identify a first packed data source operand, a field to identify a second packed data source operand, and a field to identify a destination operand to store reduction-based generated mask;

executing the decoded instruction according to a reduction operation specified by the instruction by determining whether there are conflicts between data elements of the identified first packed data source operand and for each data element position where there is not a conflict, setting a corresponding data element position in the identified destination operand; and for each conflict, applying the reduction operation to data elements of corresponding data elements of the identified second packed data source operand to determine which data element position to set in the identified destination operand and setting said position.

Example 9

The method of example 8, wherein the reduction operation is determined by an immediate value of the instruction.

Example 10

The method of example 8, wherein the reduction operation is determined by the opcode of the instruction.

Example 11

The method any of examples 8-10, further comprising: updating the identified second packed data source operand according to the reduction operation.

Example 12

The method of any of examples 8-11, wherein the reduction operation is one of minimum, maximum, or arithmetic.

Example 13

The method of any of examples 8-12, wherein the identified first and second packed data source operands are registers.

Example 14

The method of any of examples 8-13, wherein the identified destination operand is a writemask register.

Example 15

A non-tangible machine readable storage medium storing an instruction that is to cause a processor to perform a method comprising:
decoding a single instruction, the instruction including a field for an opcode to indicate a reduction-based mask generation operation is to be performed, a field to identify a first packed data source operand, a field to identify a second packed data source operand, and a field to identify a destination operand to store reduction-based generated mask;
executing the decoded instruction according to a reduction operation specified by the instruction by determining whether there are conflicts between data elements of the identified first packed data source operand and for each data element position where there is not a conflict, setting a corresponding data element position in the identified destination operand; and for each conflict, applying the reduction operation to data elements of corresponding data elements of the identified second packed data source operand to determine which data element position to set in the identified destination operand and setting said position

Example 16

The non-tangible machine readable storage medium of example 15, wherein the reduction operation is determined by an immediate value of the instruction.

Example 17

The non-tangible machine readable storage medium of example 15, wherein the reduction operation is determined by the opcode of the instruction.

Example 18

The non-tangible machine readable storage medium of example 15, further comprising:
updating the identified second packed data source operand according to the reduction operation.

Example 19

The non-tangible machine readable storage medium of example 15, wherein the reduction operation is one of minimum, maximum, or arithmetic.

Example 20

The non-tangible machine readable storage medium of example 15, wherein the identified first and second packed data source operands are registers.

Example 21

An apparatus comprising:
decode circuitry to decode an instruction, the instruction including a field for an opcode to indicate a reduction-based scatter operation is to be performed, a field to identify a first packed data source operand, a field to identify a second packed data source operand, one or more fields to be used to generate one or more destination addresses;
execution circuitry to execute the decoded instruction according to a reduction operation specified by the instruction to scatter to memory data elements of selected data element positions of the identified second packed using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the opcode to data elements of corresponding data elements of the identified second packed data source operand to determine which data element position to set in the identified destination operand and setting said position; and 3) scattering data elements of the updated identified second packed data source operand at addresses generated using masked indices of the first packed data source operand.

Example 22

The apparatus of example 21, wherein the addresses are generated using scale, index, and base (SIB) addressing, wherein and index of the sib address is determined by applying the generated mask to the indices of the first packed data source operand.

Example 23

The apparatus of any of examples 21-22, further comprising:
the execution circuitry to update the identified second packed data source operand according to the reduction operation.

Example 24

The apparatus of any of examples 21-23, wherein the reduction operation is determined by an immediate value of the instruction.

Example 25

The apparatus of any of examples 21-23, wherein the reduction operation is determined by the opcode of the instruction.

Example 26

The apparatus of any of examples 21-25, wherein the reduction operation is one of minimum, maximum, or arithmetic.

Example 27

The apparatus of any of examples 21-26, wherein the identified first and second packed data source operands are registers.

Example 28

The apparatus of any of examples 21-27, wherein the identified destination operand is a writemask register.

Example 29

A method comprising:
decoding an instruction, the instruction including a field for an opcode to indicate a reduction-based scatter operation is to be performed, a field to identify a first packed data source operand, a field to identify a second packed data source operand, one or more fields to be used to generate one or more destination addresses;
executing the decoded instruction according to a reduction operation specified by the instruction to scatter to memory data elements of selected data element positions of the identified second packed using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the opcode to data elements of corresponding data elements of the identified second packed data source operand to determine which data element position to set in the identified destination operand and setting said position; and 3) scattering data elements of the updated identified second packed data source operand at addresses generated using masked indices of the first packed data source operand.

Example 30

The method of example 29, wherein the addresses are generated using scale, index, and base (SIB) addressing, wherein and index of the sib address is determined by applying the generated mask to the indices of the first packed data source operand.

Example 31

The method of any of examples 29-30, further comprising:
updating the identified second packed data source operand according to the reduction operation.

Example 32

The method of any of examples 29-31, wherein the reduction operation is determined by an immediate value of the instruction.

Example 33

The method of any of examples 29-32, wherein the reduction operation is determined by the opcode of the instruction.

Example 34

The method of any of examples 29-33, wherein the reduction operation is one of minimum, maximum, or arithmetic.

Example 35

The method of any of examples 29-34, wherein the identified first and second packed data source operands are registers.

Example 36

The method of any of examples 29-35, wherein the identified destination operand is a writemask register.

Example 37

A non-tangible machine readable storage medium storing an instruction that is to cause a processor to perform a method according to any of examples 29-36.

I claim:
1. An apparatus comprising:
   decode circuitry to decode a single instruction, the instruction including a field for an opcode to indicate a reduction-based mask generation operation is to be performed, a field to identify a first packed data source operand, a field to identify a second packed data source operand, and a field to identify a destination operand to store reduction-based generated mask;
   execution circuitry to execute the decoded instruction according to a reduction operation specified by the instruction by determining whether there are conflicts between data elements of the identified first packed data source operand and for each data element position where there is not a conflict, setting a corresponding data element position in the identified destination operand; and for each conflict, applying the reduction operation to data elements of corresponding data elements of the identified second packed data source operand to determine which data element position to set in the identified destination operand and setting said position.

2. The apparatus of claim 1, wherein the reduction operation is determined by an immediate value of the instruction.

3. The apparatus of claim 1, wherein the reduction operation is determined by the opcode of the instruction.

4. The apparatus of claim 1, further comprising:
   the execution circuitry to update the identified second packed data source operand according to the reduction operation.

5. The apparatus of claim 1, wherein the reduction operation is one of minimum, maximum, or arithmetic.

6. The apparatus of claim 1, wherein the identified first and second packed data source operands are registers.

7. The apparatus of claim 1, wherein the identified destination operand is a writemask register.

8. A method comprising:
   decoding a single instruction, the instruction including a field for an opcode to indicate a reduction-based mask generation operation is to be performed, a field to identify a first packed data source operand, a field to identify a second packed data source operand, and a field to identify a destination operand to store reduction-based generated mask;
   executing the decoded instruction according to a reduction operation specified by the instruction by determining whether there are conflicts between data elements of the identified first packed data source operand and for each data element position where there is not a conflict, setting a corresponding data element position in the identified destination operand; and for each conflict, applying the reduction operation to data elements of corresponding data elements of the identified second packed data source operand to determine which data element position to set in the identified destination operand and setting said position.

9. The method of claim 8, wherein the reduction operation is determined by an immediate value of the instruction.

10. The method of claim 8, wherein the reduction operation is determined by the opcode of the instruction.

11. The method of claim 8, further comprising:
updating the identified second packed data source operand according to the reduction operation.

12. The method of claim 8, wherein the reduction operation is one of minimum, maximum, or arithmetic.

13. The method of claim 8, wherein the identified first and second packed data source operands are registers.

14. The method of claim 8, wherein the identified destination operand is a writemask register.

15. A non-tangible machine-readable storage medium storing an instruction that is to cause a processor to perform a method comprising: decoding a single instruction, the instruction including a field for an opcode to indicate a reduction-based mask generation operation is to be performed, a field to identify a first packed data source operand, a field to identify a second packed data source operand, and a field to identify a destination operand to store reduction-based generated mask; executing the decoded instruction according to a reduction operation specified by the instruction by determining whether there are conflicts between data elements of the identified first packed data source operand and for each data element position where there is not a conflict, setting a corresponding data element position in the identified destination operand; and for each conflict, applying the reduction operation to data elements of corresponding data elements of the identified second packed data source operand to determine which data element position to set in the identified destination operand and setting said position.

16. The method of claim 8, wherein the reduction operation is determined by an immediate value of the instruction.

17. The non-tangible machine-readable storage medium of claim 15, wherein the reduction operation is determined by the opcode of the instruction.

18. The non-tangible machine-readable storage medium of claim 15, further comprising:
updating the identified second packed data source operand according to the reduction operation.

19. The non-tangible machine-readable storage medium of claim 15, wherein the reduction operation is one of minimum, maximum, or arithmetic.

20. The non-tangible machine-readable storage medium of claim 15, wherein the identified first and second packed data source operands are registers.

21. An apparatus comprising:
decode circuitry to decode an instruction, the instruction including a field for an opcode to indicate a reduction-based scatter operation is to be performed, a field to identify a first packed data source operand, a field to identify a second packed data source operand, one or more fields to be used to generate one or more destination addresses;
execution circuitry to execute the decoded instruction according to a reduction operation specified by the instruction to scatter to memory data elements of selected data element positions of the identified second packed data source operand using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the opcode to data elements of corresponding data elements of the identified second packed data source operand to determine which data element position to set in the identified destination operand and setting said position; and 3) scattering data elements of the updated identified second packed data source operand at addresses generated using masked indices of the first packed data source operand.

22. The apparatus of claim 21, wherein the addresses are generated using scale, index, and base (SIB) addressing, wherein and index of the sib address is determined by applying the generated mask to the indices of the first packed data source operand.

23. The apparatus of claim 22, further comprising:
the execution circuitry to update the identified second packed data source operand according to the reduction operation.

24. The apparatus of claim 21, wherein the reduction operation is determined by an immediate value of the instruction.

25. The apparatus of claim 21, wherein the reduction operation is determined by the opcode of the instruction.

26. The apparatus of claim 21, wherein the reduction operation is one of minimum, maximum, or arithmetic.

27. The apparatus of claim 21, wherein the identified first and second packed data source operands are registers.

28. The apparatus of claim 21, wherein the identified destination operand is a writemask register.

29. A method comprising:
decoding an instruction, the instruction including a field for an opcode to indicate a reduction-based scatter operation is to be performed, a field to identify a first packed data source operand, a field to identify a second packed data source operand, one or more fields to be used to generate one or more destination addresses;
executing the decoded instruction according to a reduction operation specified by the instruction to scatter to memory data elements of selected data element positions of the identified second packed data source operand using index values of the identified first packed data source operand according to a mask generated by determining whether there are conflicts between data elements of the identified first packed data source operand and 1) for each data element position where there is not a conflict setting a corresponding data element position in the identified destination operand; 2) for each conflict, applying a reduction operation indicated by the opcode to data elements of corresponding data elements of the identified second packed data source operand to determine which data element position to set in the identified destination operand and setting said position; and 3) scattering data elements of the updated identified second packed data source operand at addresses generated using masked indices of the first packed data source operand.

30. The method of claim 29, wherein the addresses are generated using scale, index, and base (SIB) addressing, wherein and index of the sib address is determined by applying the generated mask to the indices of the first packed data source operand.

31. The method of claim 29, further comprising:
  updating the identified second packed data source operand according to the reduction operation.

32. The method of claim 29, wherein the reduction operation is determined by an immediate value of the instruction.

33. The method of claim 29, wherein the reduction operation is determined by the opcode of the instruction.

34. The method of claim 29, wherein the reduction operation is one of minimum, maximum, or arithmetic.

35. The method of claim 29, wherein the identified first and second packed data source operands are registers.

36. The method of claim 29, wherein the identified destination operand is a writemask register.

37. A non-tangible machine-readable storage medium storing an instruction that is to cause a processor to perform a method according to any of claims 29-36.

* * * * *